United States Patent [19]
Iida et al.

[11] Patent Number: 5,801,797
[45] Date of Patent: Sep. 1, 1998

[54] IMAGE DISPLAY APPARATUS INCLUDES AN OPPOSITE BOARD SANDWICHED BY ARRAY BOARDS WITH END PORTIONS OF THE ARRAY BOARDS BEING OFFSET

[75] Inventors: Atsuko Iida; Tatsuro Uchida; Akira Kinno; Masayuki Saito; Yukio Kizaki, all of Yokohama; Takeshi Miyagi, Fujisawa; Miki Mori; Yumi Fukuda, both of Yokohama, all of Japan

[73] Assignee: Kabushiki Kaisha Toshiba, Kawasaki, Japan

[21] Appl. No.: 816,725

[22] Filed: Mar. 13, 1997

[30] Foreign Application Priority Data

Mar. 18, 1996 [JP] Japan .................. 8-061517

[51] Int. Cl.⁶ .......... G03F 1/133; G02F 1/1347; G02F 1/1343; G02F 1/1339
[52] U.S. Cl. .................. 349/73; 349/82; 349/83; 349/139; 349/155
[58] Field of Search .................. 349/73, 74, 82, 349/83, 139, 155

[56] References Cited

U.S. PATENT DOCUMENTS

| | | | |
|---|---|---|---|
| 3,873,186 | 3/1975 | Ritchie | 349/74 |
| 4,260,224 | 4/1981 | Takayama | 349/83 |
| 4,335,936 | 6/1982 | Nonomura et al. | 349/82 |
| 4,408,836 | 10/1983 | Kikuno | 349/73 |
| 4,443,062 | 4/1984 | Togashi et al. | 349/83 |
| 4,485,376 | 11/1984 | Noble | 349/83 |
| 4,832,457 | 5/1989 | Saitoh et al. | 349/73 |
| 5,164,853 | 11/1992 | Shimazaki | 349/73 |
| 5,566,013 | 10/1996 | Suzuki et al. | 349/155 |
| 5,568,287 | 10/1996 | Shingaki et al. | 349/74 |
| 5,592,314 | 1/1997 | Ogasawara et al. | 349/74 |

FOREIGN PATENT DOCUMENTS 56-121014 9/1981 Japan .

*Primary Examiner*—William L. Sikes
*Assistant Examiner*—Tarifur R. Chowdhury
*Attorney, Agent, or Firm*—Finnegan, Henderson, Farabow, Garrett & Dunner, L.L.P.

[57] ABSTRACT

The image display apparatus is capable of displaying an image on a large screen in which non-display regions are completely eliminated or minimized. The image display apparatus comprises an opposite board in which common electrodes made of transparent conductive resin are respectively formed on both surfaces of a transparent substrate. A plurality of array boards in each of which semiconductor element and a signal line are formed on a transparent substrate are arranged on both surfaces of the opposite board, such that display regions of end portions of the array boards face each other a sandwich of the opposite board inserted therebetween. Frame-like sealing members made of transparent resin are respectively inserted in clearances between the opposite board and the array boards. Liquid crystal is enclosed in each of spaces surrounded by the frame-like sealing members between the opposite board and the array boards.

21 Claims, 15 Drawing Sheets

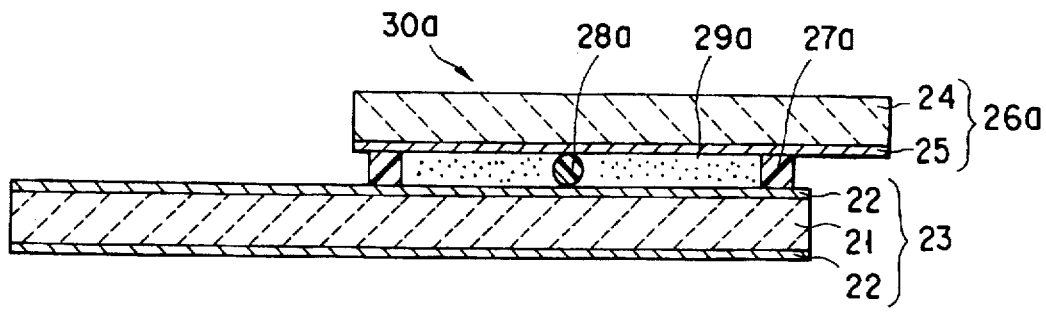
F I G. 1A
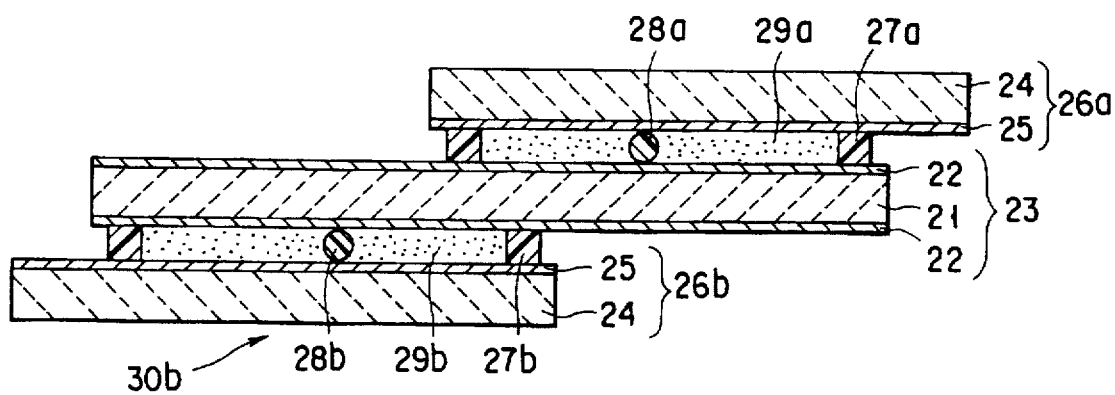
F I G. 1B
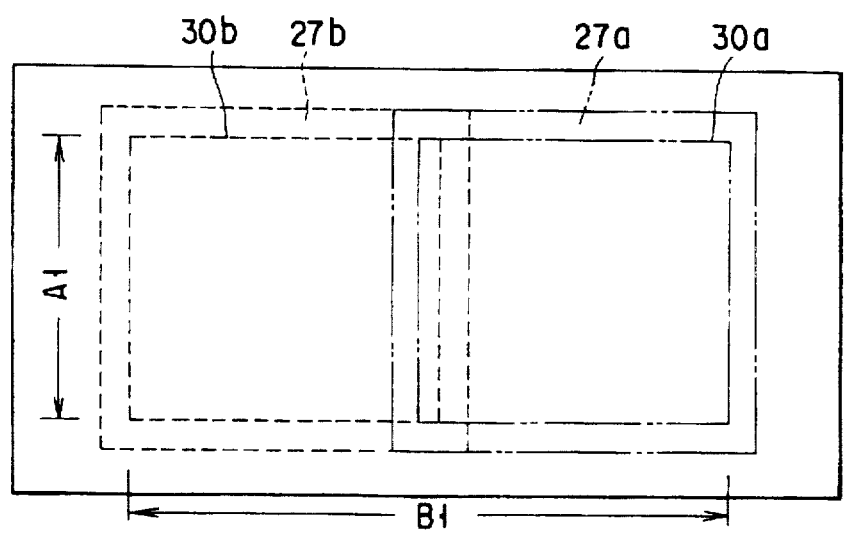
F I G. 2

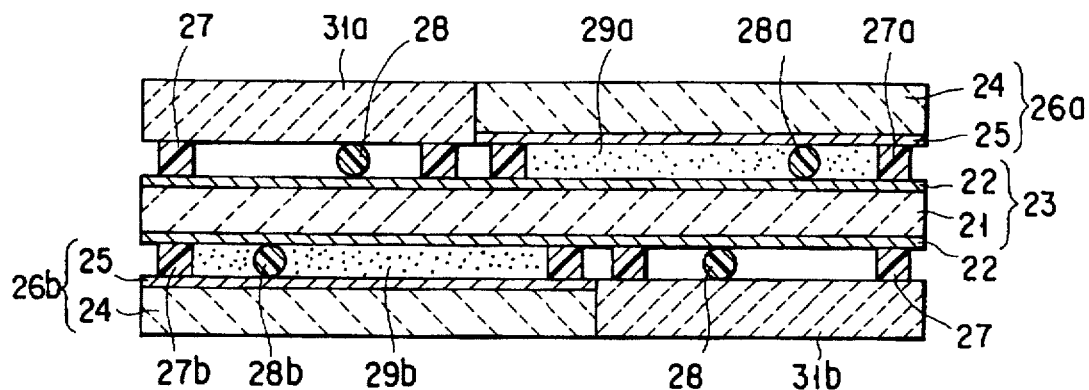
F I G. 3
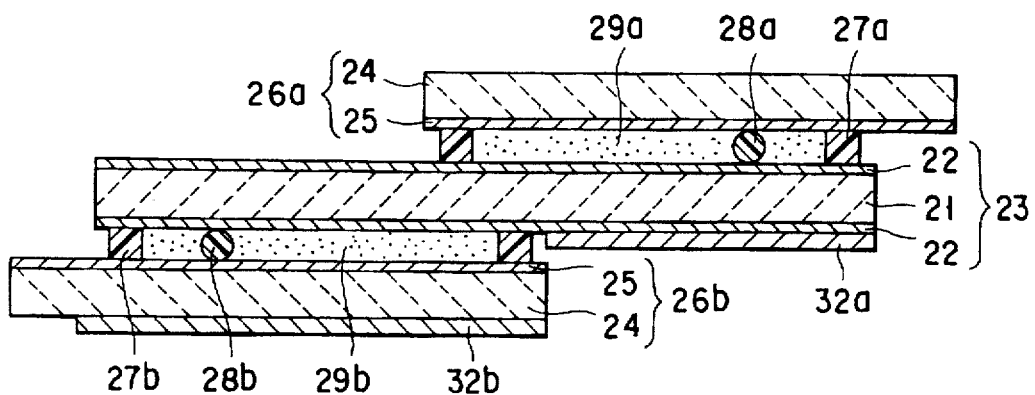
F I G. 4
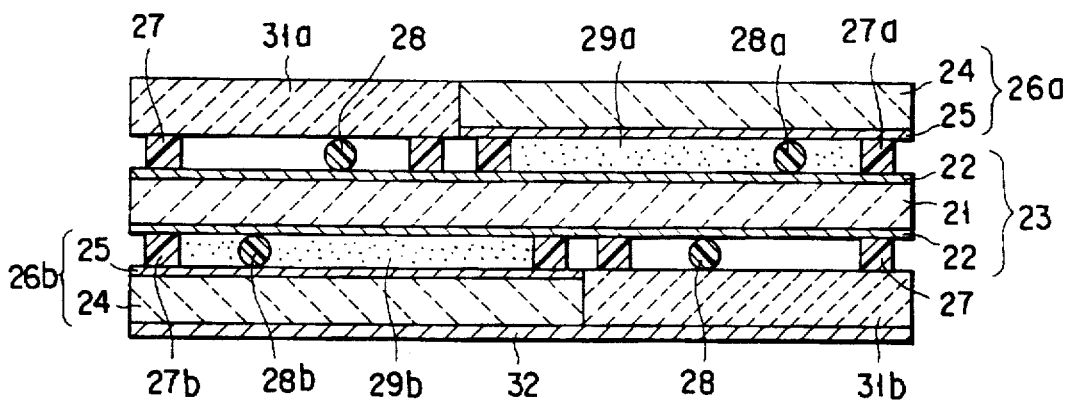
F I G. 5

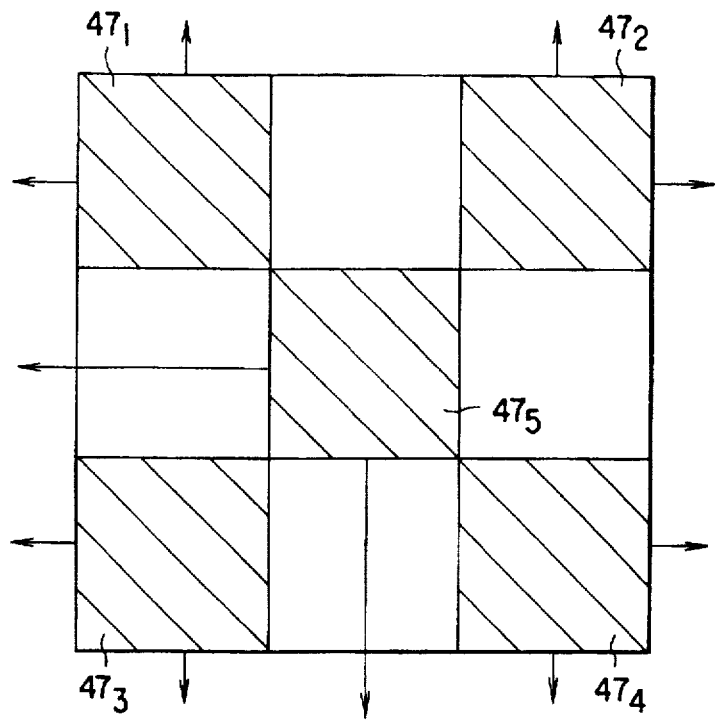
F I G. 10
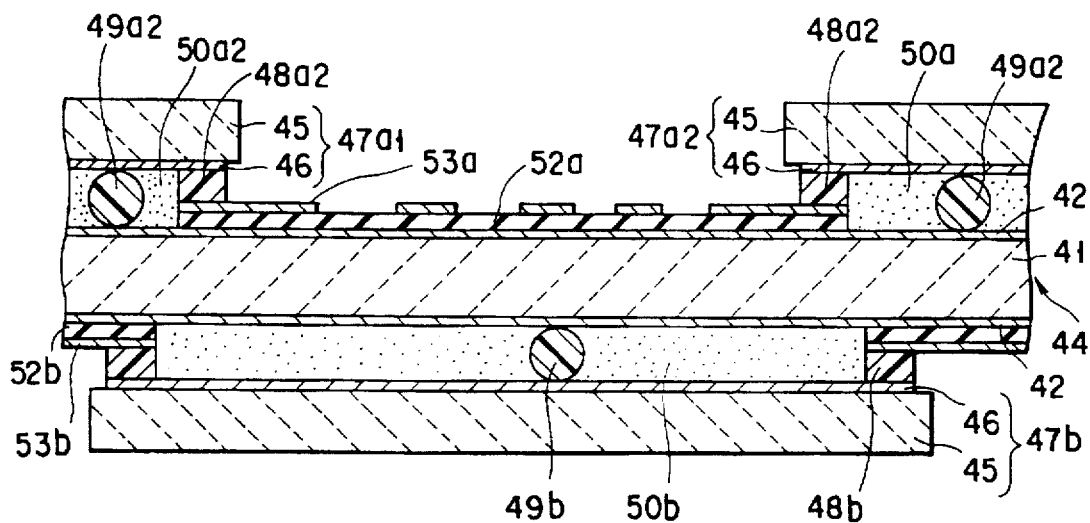
F I G. 11

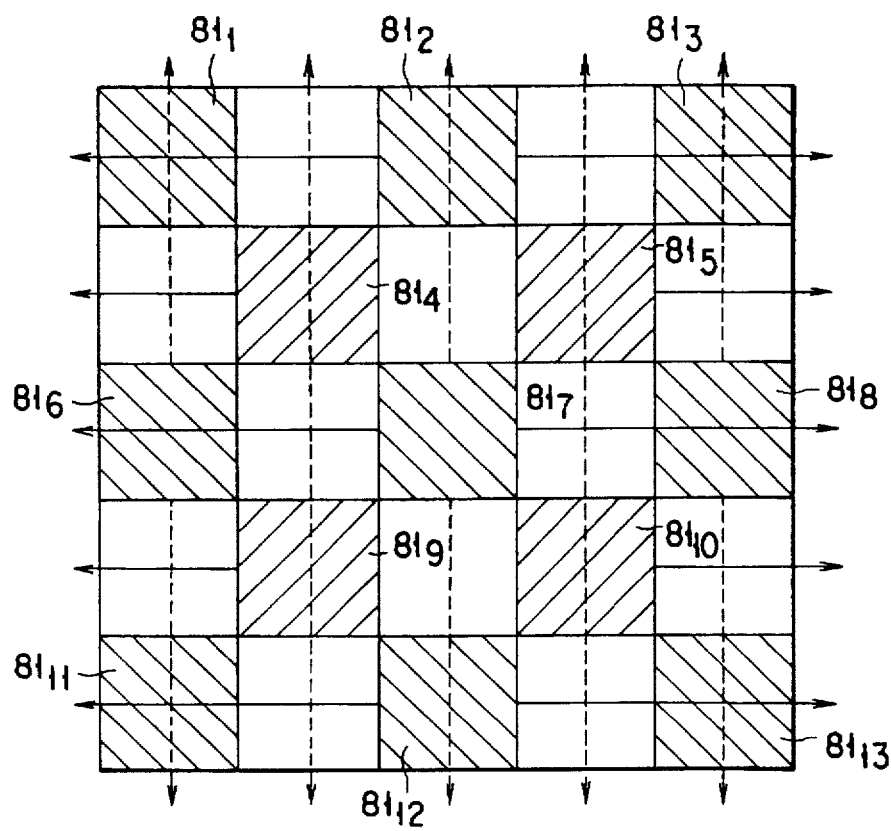
F I G. 16

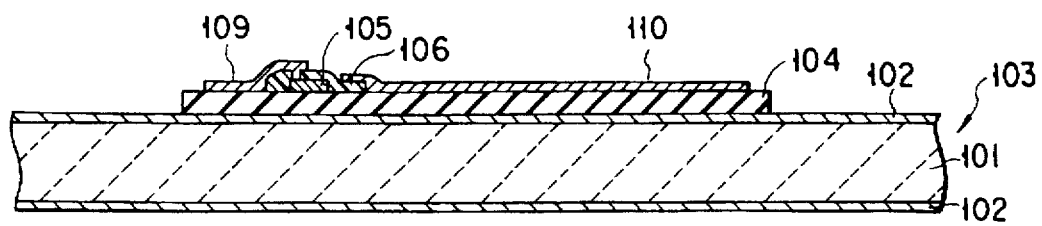
F I G. 17A
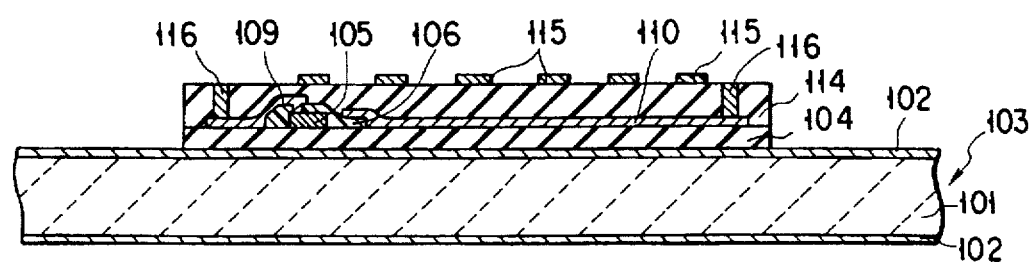
F I G. 17B
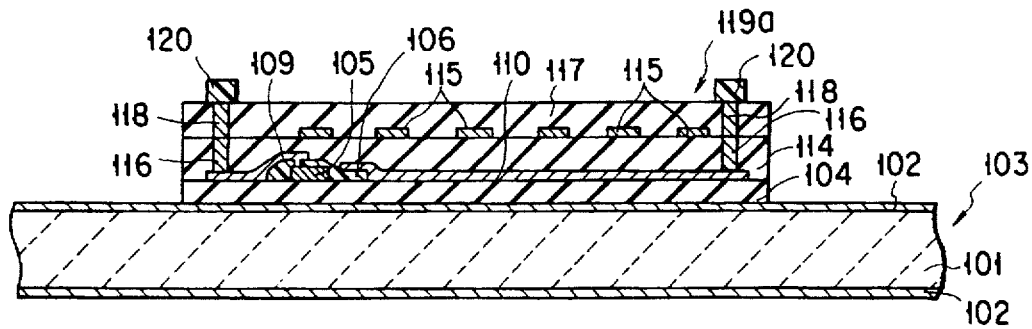
F I G. 17C
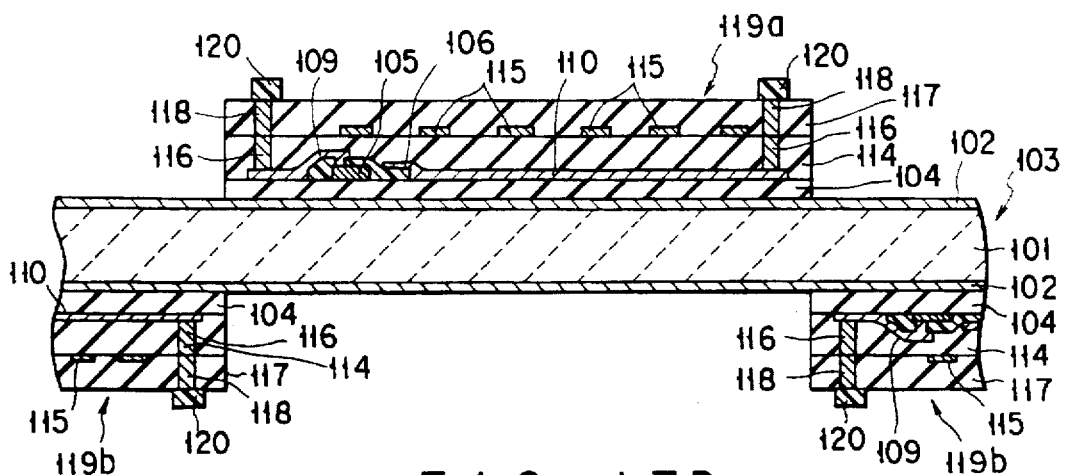
F I G. 17D

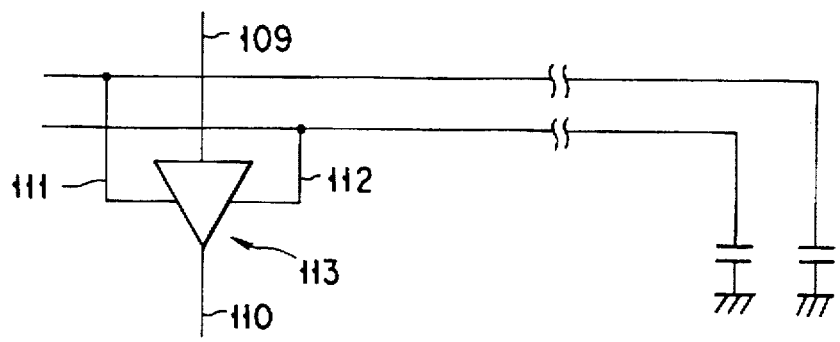
F I G. 21
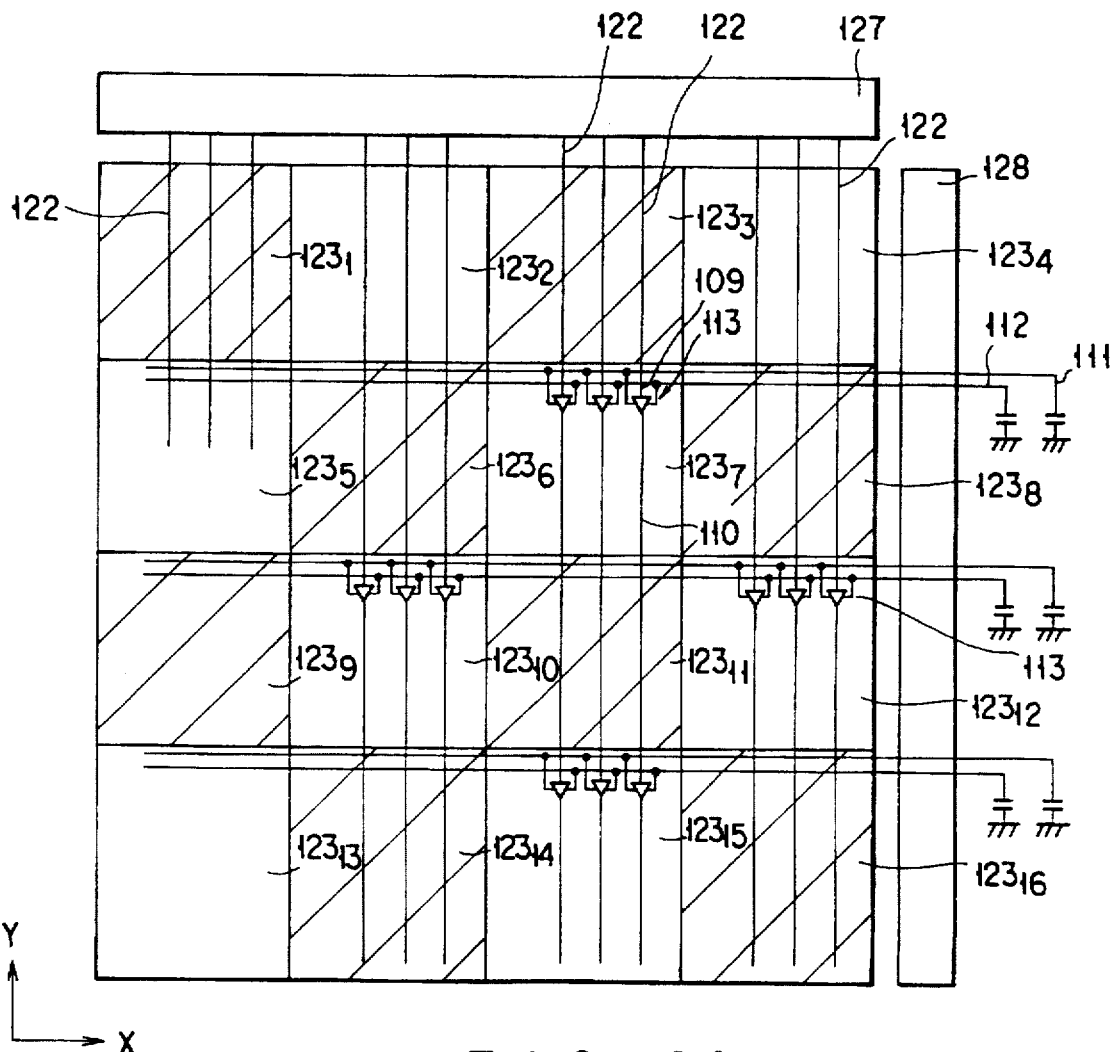
F I G. 22

IMAGE DISPLAY APPARATUS INCLUDES AN OPPOSITE BOARD SANDWICHED BY ARRAY BOARDS WITH END PORTIONS OF THE ARRAY BOARDS BEING OFFSET

BACKGROUND OF THE INVENTION

The present invention relates to an image display apparatus, and particularly, to an image display apparatus in which layout of an opposite board and an array board.

A conventional image display apparatus has a structure in which a frame-like sealing member 7 is formed at a clearance between an opposite board 3 and an array board 6, and liquid crystal 8 is enclosed in the frame-like sealing member as shown in FIG. 23. The opposite board 6 is constructed by forming a common electrode 2 made of transparent conductive material on a surface of a transparent substrate 1. The array board 6 is constructed by forming a semiconductor element and a signal line 5 on a surface of a transparent substrate 4. An appropriate amount of spacers 9 consisting of resin beads or the likes having a uniform grain diameter is sprayed between the opposite board 3 and the array board 6, to maintain the clearance to be constant. In the image display apparatus shown in FIG. 23, the method of preparing an array board by forming small semiconductor elements with high accuracy on a transparent substrate having a large area is subject to limitations from manufacturing apparatuses, and as a result, it is difficult to enlarge the screen size of the image display apparatus.

Hence, an image display apparatus with a large area has been realized, for example, in a manner as shown in FIG. 24 in which two array boards 6a and 6b are arranged to be adjacent to each other on a surface of an opposite electrode 3 where the common electrode 2 is formed, frame-like sealing members 7a and 7b are respectively formed in a clearance between the array boards 6a and 6b and the common electrode, and liquid crystal 8a and 8b are respectively enclosed in the frame-like sealing members 7a and 7b. However, in the image display apparatus having the structure as shown in FIG. 24, a non-display area 10 inevitably exists at end portions of the frame-like sealing members 7a and 7b adjacent to each other of the array board and at a clearance between these end portions, such that the non-display area 10 divides the display regions 11a and 11b from each other as shown in FIG. 25. Therefore, a conventional image display apparatus has a problem that a large area is realized with difficulties.

BRIEF SUMMARY OF THE INVENTION

The present invention has an object of providing an image display apparatus which attains a large screen by completely eliminating or minimizing a non-display region existing on the display surface.

The present invention has another object of providing an image display apparatus which attains a large screen by completely eliminating or minimizing a non-display region existing on the display surface, and in which signal lines of an array board positioned inside, viewed in a plan view, can be easily led to the outside.

The present invention has further another object of providing an image display apparatus which attains a large screen by completely eliminating or minimizing non-display regions in a display surface, and in which signal lines of an array board positioned inside, viewed in a plan view, can be easily led to the outside, and voltages of lead wirings each connected with the signal lines are corrected, for example, by amplification so that excellent image quality is obtained.

According to the present invention, there is provided an image display apparatus comprising:

an opposite board in which common electrodes are respectively formed on both surfaces of a transparent substrate;

array boards in each of which a semiconductor element and a signal line are formed on a transparent substrate, the array boards being arranged on both of the surfaces of the opposite board such that display regions of end portions of the array boards face each other a sandwich of the opposite board;

frame-like sealing members made of transparent resin and inserted respectively in clearances between the opposite board and the array boards; and liquid crystal enclosed in each of spaces surrounded by the frame-like sealing members, between the opposite board and the array boards.

Also, according to the present invention, there is provided an image display apparatus comprising:

an opposite board in which common electrodes are respectively formed on both surfaces of a transparent substrate;

array boards in each of which a semiconductor element and a signal line are formed on a transparent substrate, the array boards being arranged on both of the surfaces of the opposite board such that display regions of end portions of the array boards face each other a sandwich of the opposite board;

a plurality of connection lines for leading the signal lines of the array boards formed on the surface of the opposite board in an opposite side with the array board;

frame-like sealing members made of transparent resin and inserted respectively in clearances between the opposite board and the array boards; and liquid crystal enclosed in each of spaces surrounded by the frame-like sealing members, between the opposite board and the array boards.

Further, according to the present invention, there is provided an image display apparatus comprising:

an opposite board in which common electrodes are respectively formed on both surfaces of a transparent substrate;

array boards in each of which a semiconductor element and a signal line are formed on a transparent substrate, the array boards being arranged on both of the surfaces of the opposite board such that display regions of end portions of the array boards face each other a sandwich of the opposite board;

at least one layer of connection lines for leading the signal lines of the array boards provided, with an insulating layer inserted, on the surface of the opposite board in an opposite side with the array boards, respectively;

signal correction circuits inserted in portions of the connection lines which are close to the array boards, respectively;

frame-like sealing members made of transparent resin and inserted respectively in clearances between the opposite board and the array boards; and liquid crystal enclosed in each of spaces surrounded by the frame-like sealing members, between the opposite board and the array boards.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are sectional views schematically showing steps of manufacturing an image display apparatus according to an embodiment 1 of the present invention.

FIG. 2 is a plan view of an image display apparatus manufactured in accordance with the embodiment 1 of the present invention.

FIG. 3 is a schematic sectional view showing an image display apparatus according to an embodiment 2 of the present invention.

FIG. 4 is a schematic sectional view showing an image display apparatus according to an embodiment 3 of the present invention.

FIG. 5 is a schematic sectional view showing an image display apparatus according to an embodiment 4 of the present invention.

FIG. 10 is a view schematically showing the layout and the leading of signal lines of an array board having a structure according to the embodiment 7 of the present invention.

FIG. 11 is a schematic sectional view showing an image display apparatus according to an embodiment 8 of the present invention.

FIG. 16 is a view schematically showing the layout and the leading of signal lines of an array board having a structure according to the embodiment 11 of the present invention.

FIGS. 17A to 17F are sectional views showing steps of manufacturing an image display apparatus according to an embodiment 12 of the present invention.

FIG. 21 is a circuit diagram of the signal correction circuit shown in FIG. 18.

FIG. 22 is a view schematically showing a drive system of a liquid crystal display apparatus having the signal correction circuit shown in FIG. 18.

DETAILED DESCRIPTION OF THE INVENTION

Figure 6:
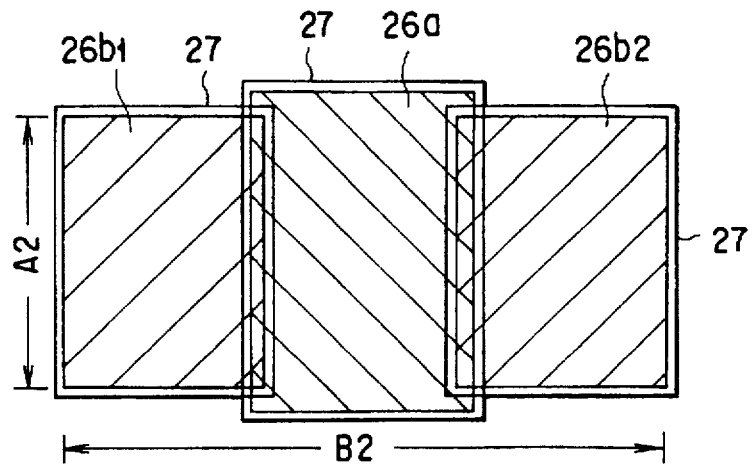
FIG. 6 is a view schematically showing a display region of an image display apparatus according to an embodiment 5 of the present invention.

In the following, an image display apparatus according to the present invention will be described in detail.

An image display apparatus according to the present invention comprises an opposite board and a plurality of array boards. The opposite board is constructed by forming common electrodes made of transparent conductive material such as ITO or the like on formed on both surfaces of a transparent substrate made of, for example, glass, respectively. Each array board is constructed by forming a semiconductor element such as a thin film transistor or the like and a signal line, partially made of transparent conductive material such as ITO or the like, on a transparent substrate made of, for example, glass. The array boards are respectively arranged on both surfaces of the opposite board, such that display regions of end portions of the array boards face each other a sandwich of the opposite board. Specifically, viewed from the display surface side, the array boards are arranged to be adjacent to each other, such that the array boards are partially overlap each other, with the opposite board arranged therebetween. Frame-like sealing members made of transparent resin are respectively formed in clearances between the opposite board and the array boards. Liquid crystal is enclosed in each of spaces surrounded by the frame-like sealing members, between the opposite board and the array boards.

For example, epoxy resin or the like may be used as the transparent resin mentioned above. In particular, it is preferable to use transparent resin having a transparency of 80% or more over a range of wavelength of 500 nm to 800 nm. Such preferable transparent resin may be, for example, benzocyclobutane (BCB) resin, parfluorocyclobutane (PFCB) resin, or the like which has an excellent heat resistance in addition to a transparency as described above.

In clearances between the opposite board and the array boards, spacers such as beads having a uniform average grain diameter may be uniformly sprayed. These spacers are preferably made of low-light absorption material such as silica, glass, styrene resin, or the like which has a coefficient of light absorption of 30% or less.

The method of manufacturing the above image display apparatus according to the present invention will be explained below.

At first, common electrodes made of, for example, ITO are respectively formed on both surface of a transparent substrate made of, for example, glass, to prepare an opposite board. In addition, a semiconductor element such as a thin film transistor and a signal line partially made of transparent conductive material such as ITO are formed on a transparent substrate made of, for example, glass, to prepare a plurality of array boards.

In the next, transparent resin are coated on the periphery of the surfaces of the array boards where the semiconductor element is formed, respectively, to form a plurality frame-like sealing members not yet hardened. Subsequently, the array boards are arranged on the opposite board with the frame-like sealing members inserted therebetween, respectively, such that the display regions of the array boards face each other a sandwich of the opposite board. Subsequently, liquid crystal is injected into each of the frame-like sealing members not yet hardened, with spacers inserted between the opposite board and the array boards, to maintain a clearance therebetween, and injection openings are closed with resin to enclose liquid crystal, respectively. Thereafter, a heating treatment is carried out to harden the frame-like sealing members. Thus, an image display apparatus is manufactured.

In the above method of manufacturing an image display apparatus, the frame-like sealing members are formed on array boards, respectively. However, the frame-like sealing members may be formed at predetermined regions on the opposite board, respectively.

In the image display apparatus according to the present invention, transparent boards, i.e., auxiliary transparent boards may be provided on surface regions of the opposite board in the opposite side with the array boards arranged, such that the auxiliary transparent boards have surfaces in a plane equal to the surfaces of the array boards. Spacers, made of low-light absorption material such as styrene resin, may be inserted between the opposite board and the auxiliary transparent boards, respectively.

In the above-described image display apparatus according to the present invention, the array boards are respectively arranged on both surfaces of the opposite board, such that display regions of end portions of the array boards face each other a sandwich of the opposite board. Thus, viewed from the display surface side, the array boards are arranged to be adjacent to each other, such that the array boards partially overlap each other, with the opposite board arranged therebetween. The image display apparatus has a structure in which frame-like sealing members made of transparent resin are respectively formed in clearances between the opposite board and the array boards, and liquid crystal is enclosed in each of spaces surrounded by the sealing members, between the opposite board and the array boards.

In the image display apparatus having this structure, even though a frame-like sealing member as a non-display region exists in the periphery of an array board arranged in the display surface side, another array board is arranged in the side opposite to the display surface side with an opposite board inserted therebetween, such that end portions of display regions of these array boards overlap each other. In addition, the opposite board and the frame-like sealing members are all transparent. As a result of this, the display region of the latter array board provided on the opposite board so as to projectively overlap the former array board is displayed through the frame-like sealing member as a non-display region of the former array board provided in the display surface side. Thus, the display characteristic of the frame-like sealing member of an array board positioned in the display surface side can be compensated for by the display region of another array board. Therefore, non-display region existing on the display surface is completely eliminated or reduced to be negligibly small, so that it is possible to easily realize an image display apparatus having a large screen.

In addition, the transparency of the frame-like sealing members can be improved by forming the frame-like sealing members from transparent resin such as BCB resin or the like which has a transparency of 80% or more over a range of wavelength of 500 nm to 800 nm. Further, the opposite board and the array boards can be rigidly connected with each other by hardening the frame-like sealing members made of BCB resin not yet hardened. As a result of this, even if the width of each frame-like sealing member is set to be as narrow as 1 mm or less, the opposite board and the array boards can be excellently connected with each other. Therefore, the transparency of the frame-like sealing members on the display surface can be improved, and the display characteristics can further be improved by reducing the area of the sealing members.

In the next, another image display apparatus according to the present invention will be explained below.

The image display apparatus comprises an opposite board and a plurality array boards. The opposite board is constructed by forming common electrodes made of transparent conductive material such as ITO or the like on formed on both surfaces of a transparent substrate made of, for example, glass, respectively. Each array board is constructed by forming a semiconductor element such as a thin film transistor or the like and a signal line, partially made of transparent conductive material such as ITO or the like on a transparent substrate made of, for example, glass. The array boards are respectively arranged on both surfaces of the opposite board, such that display regions of end portions of the array boards face each other a sandwich of the opposite board. Specifically, viewed from the display surface side, the array boards are arranged to be adjacent to each other, such that the array boards are partially overlap each other, with the opposite board arranged therebetween. A plurality of connection lines for leading the signal lines of the array boards are formed on the surface of the opposite board in the side which is the opposite side with the opposite board arranged therebetween. Frame-like sealing members, made of transparent resin, are respectively formed in clearances between the opposite board and the array boards. Liquid crystal is enclosed in each of spaces surrounded by the frame-like sealing members, between the opposite board and the array boards.

The connection lines are formed, for example, on the transparent substrate of the opposite board. In addition the connection lines may be formed in form of at least one wiring layer provided on the opposite board with an insulating layer inserted therebetween.

For example, epoxy resin or the like may be used as the transparent resin mentioned above. In particular, it is preferable to use transparent resin having a transparency of 80% or more over a range of wavelength of 500 nm to 800 nm. Such preferable transparent resin may be, for example, benzocyclobutane (BCB) resin, parfluorocyclobutane (PFCB) resin, or the like which has an excellent heat resistance in addition to a transparency as described above.

A transparent anisotropic conductive resin may be used as the transparent resin as described above, and the connection lines on the opposite board may be electrically connected with the signal lines of the array boards by frame-like sealing members made of the anisotropic conductive resin.

As the transparent anisotropic conductive resin, for example, it is possible to use material in which resin beads of micron order whose surfaces are respectively coated with ITO films are dispersed in ultraviolet-hardening resin containing epoxy resin as a main component.

The connection lines on the opposite board and the signal lines of the array boards may be connected with each other by a plurality of conductive grains made of Au, Al, or Al alloy or by a plurality of conductive projecting members made of Au, Al, or Al alloy, which are provided at the peripheral portions of the array boards in clearances between the opposite board and the array boards. The conductive grains or projecting members may be provided within the frame-like sealing members.

In clearances between the opposite board and the array boards, spacers such as beads having a uniform average grain diameter may be uniformly sprayed. These spacers are preferably made of low-light absorption material such as silica, glass, styrene resin, or the like which has a coefficient of light absorption of 30% or less.

The method of manufacturing this image display apparatus according to the present invention will be explained, in which connection lines of an opposite board and signal lines of array boards are electrically connected with each other, for example, by anisotropic conductive resin.

At first, common electrodes made of, for example, transparent conductive material such as ITO are respectively formed on both surface of a transparent substrate made of, for example, glass, thereby to prepare an opposite board. Subsequently, connection lines are formed on the surface of the transparent substrate in the opposite side with the array boards arranged therebetween.

In addition, a semiconductor element such as a thin film transistor and a signal line, partially made of transparent conductive material such as ITO, are formed on a transparent substrate made of, for example, glass, thereby to prepare a plurality of array boards.

In the next, frame-like sealing members made of anisotropic conductive resin are formed on the peripheries of the surfaces of the array boards where the semiconductor elements are formed. The anisotropic conductive resin has, for example, a composition in which fine conductive grains having an average grain diameter of about 5 μm and made of resin beads whose surfaces are respectively coated with ITO films are dispersed in ultraviolet-hardening resin containing epoxy resin as a main component. Subsequently, the array boards are positioned on both surfaces of the opposite board such that the frame-like sealing members of the array boards are in contact with the common electrode, respectively. Simultaneously, the array boards are arranged such that the display regions of the array boards face each other a sandwich of the opposite board arranged therebetween. In this state, the connection lines on the opposite board are electrically connected with the signal lines of the array boards, by the frame-like sealing members made of anisotropic conductive resin on the array boards. Subsequently, liquid crystal is injected into each of the frame-like sealing members and injection openings are closed with resin to enclose liquid crystal, respectively. Thus, an image display apparatus is manufactured. Note that the liquid crystal may be injected into the frame-like sealing members while maintaining clearances between the opposite board and the array boards by previously inserting spherical spacers made of, for example, low-light absorption material such as styrene resin between the opposite boards and the array boards.

In the above-described image display apparatus according to the present invention, the array boards are respectively arranged on both surfaces of the opposite board, such that display regions of end portions of the array boards face each other a sandwich of the opposite board. Thus, viewed from the display surface side, the array boards are arranged to be adjacent to each other, such that the array boards partially overlap each other, with the opposite board arranged therebetween. In addition, connection lines for leading the signal lines of the array boards are formed on the opposite board in the opposite side with the array board arranged. Further, the image display apparatus has a structure in which frame-like sealing members made of transparent resin are respectively formed in clearances between the opposite board and the array boards, and liquid crystal is enclosed in each of spaces surrounded by the sealing members, between the opposite board and the array boards.

In the image display apparatus constructed in the above structure, non-display region existing on the display surface is completely eliminated or reduced to be negligibly small, so that it is possible to easily realize an image display apparatus having a large screen, like in the other image display apparatus as described before.

In addition, since the connection lines on the opposite board are electrically connected with the signal lines of the array boards, for example, by the flame-like members made of anisotropic conductive resin, even such an array board which is positioned inside and surrounded by other array boards in a plan view can be electrically led to the outside through connection lines on a region of the opposite board which is adjacent to the array board, and therefore, it is possible to excellently drive array boards positioned inside and surrounded by other array boards.

Therefore, a plurality of array boards can be adhered together without causing problems in their drive systems, by arranging a plurality of array boards to be adjacent to each other on both surfaces of an opposite board such that display regions of end portions of the array boards partially overlap each other, with the opposite board arranged therebetween, viewed from the display surface side of the image display apparatus, and by electrically connecting connection lines of the opposite board with the signal lines of the array boards. Therefore, an image display apparatus having a large screen can be easily realized.

The electric connection between the signal lines of the array boards and the connection lines on the opposite board can be attained by a plurality of conductive grains or conductive projecting members provided in the peripheries of the array boards. In particular, reductions in the area of the display surface caused by positioning of connecting regions can be eliminated if the signal lines and the connection lines are electrically connected with each other through frame-like sealing members made of anisotropic conductive resin or conductive grains or conductive projecting members provided in frame-like sealing members made of transparent resin.

In addition, the transparency of the frame-like sealing members can be improved by forming the frame-like sealing members from transparent resin such as BCB resin or the like which has a transparency of 80% or more over a range of wavelength of 500 nm to 800 nm. Further, the opposite board and the array boards can be rigidly connected with each other by hardening the frame-like sealing members made of BCB resin not yet hardened. As a result of this, even if the width of each frame-like sealing member is set to be as narrow as 1 mm or less, the opposite board and the array boards can be excellently connected with each other. Therefore, the transparency of the frame-like sealing members on the display surface can be improved, and the display characteristics can further be improved by reducing the area of the sealing members.

Further, in case of forming the connection lines in form of at least one wiring layer provided with an insulating layer inserted, this insulating layer may be formed of transparent resin such as BCB resin which has a transparency of 80% or more over a range of wavelength of 500 nm to 800 nm. By providing connection lines (or a multi-layer wiring region) on the insulating layer made of BCB resin as described above, the transparency at the display region where the multi-layer wiring region exists can be improved much more. In addition, since the BCB resin has a dielectric constant of 3.5 or less, it is possible to prevent deformation of waveforms of signals and delays of signals due to the connection lines (or multi-layer wiring region). As a result of this, it is possible to reduce problems caused by elongating the leading distances of the signal lines.

In the next, further another image display apparatus according to the present invention will be explained.

The image display apparatus comprises an opposite board and a plurality array boards. The opposite board is constructed by forming common electrodes made of transparent conductive material such as ITO or the like on formed on both surfaces of a transparent substrate made of, for example, glass, respectively. Each array board is constructed by forming a semiconductor element such as a thin film transistor or the like and a signal line, partially made of transparent conductive material such as ITO or the like, on a transparent substrate made of, for example, glass. The array boards are respectively arranged on both surfaces of the opposite board, such that display regions of end portions of the array boards face each other a sandwich of the opposite board. Specifically, viewed from the display surface side, the array boards are arranged to be adjacent to each other, such that the array boards are partially overlap each other, with the opposite board arranged therebetween. At least one layer forming connection lines for leading the signal lines of the array boards is formed on the surface of the opposite board in the side which is opposite to the array boards with the opposite board arranged therebetween. Further, a signal correction circuit is inserted in a portion of the connection lines which is close to the array board. Frame-like sealing members made of transparent resin are respectively formed in clearances between the opposite board and the array boards. Liquid crystal is enclosed in each of spaces surrounded by the frame-like sealing members, between the opposite board and the array boards.

For example, epoxy resin or the like may be used as the transparent resin mentioned above. In particular, it is preferable to use transparent resin having a transparency of 80% or more over a range of wavelength of 500 nm to 800 nm. Such preferable transparent resin may be, for example, benzocyclobutane (BCB) resin, parfluorocyclobutane (PFCB) resin, or the like which has an excellent heat resistance in addition to a transparency as described above.

A transparent anisotropic conductive resin may be used as the transparent resin as described above, and the connection lines on the opposite board may be electrically connected with the signal lines of the array boards by frame-like sealing members made of the anisotropic conductive resin. As the transparent anisotropic conductive resin, for example, it is possible to use material in which resin beads of micron order whose surfaces are respectively coated with ITO films are dispersed in ultraviolet-hardening resin containing epoxy resin as a main component.

The connection lines on the opposite board and the signal lines of the array boards may be connected with each other by a plurality of conductive grains made of Au, Al, or Al alloy or by a plurality of conductive projecting members made of Au, Al, or Al alloy, which are provided at the peripheral portions of the array boards in clearances between the opposite board and the array boards. The conductive grains or projecting members may be provided within the frame-like sealing members.

In clearances between the opposite board and the array boards, spacers such as beads having a uniform average grain diameter may be uniformly sprayed. These spacers are preferably made of low-light absorption material such as silica, glass, styrene resin, or the like which has a coefficient of light absorption of 30% or less.

In the above-described image display apparatus according to the present invention, the array boards are respectively arranged on both surfaces of the opposite board, such that display regions of end portions of the array boards face each other a sandwich of the opposite board. Thus, viewed from the display surface side, the array boards are arranged to be adjacent to each other, such that the array boards partially overlap each other, with the opposite board arranged therebetween. In addition, at least one layer of connection lines for leading the signal lines of the array boards is formed on the surface of the opposite board in the opposite side with the array board arranged, and a signal correction circuit is inserted in a portion of the connection lines which is close to the array board. Further, the image display apparatus has a structure in which frame-like sealing members made of transparent resin are respectively formed in clearances between the opposite board and the array boards, and liquid crystal is enclosed in each of spaces surrounded by the sealing members, between the opposite board and the array boards.

In the image display apparatus constructed in the above structure, non-display region existing on the display surface is completely eliminated or reduced to be negligibly small, so that it is possible to easily realize an image display apparatus having a large screen, like in the other image display apparatuses described before.

In addition, since the connection lines on the opposite board are electrically connected with the signal lines of the array boards, for example, by the flame-like members made of anisotropic conductive resin, even such an array board which is positioned inside and surrounded by other array boards in a plan view can be electrically led to the outside through connection lines on a region of the opposite board which is adjacent to the array board, and therefore, it is possible to excellently drive array boards positioned inside and surrounded by other array boards. Waveforms of the signal led through the signal lines are corrected, e.g., amplified by signal correction circuits. Therefore, the array boards can be driven with signals having initial waveforms even when the leading distances are elongated by adhering a plurality of array boards.

Therefore, a plurality of array boards can be adhered together without causing problems in their drive systems, by arranging a plurality of array boards to be adjacent to each other on both surfaces of an opposite board such that display regions of end portions of the array boards partially overlap each other, with the opposite board arranged therebetween, viewed from the display surface side of the image display apparatus, and by electrically connecting connection lines of the opposite board with the signal lines of the array boards. Therefore, an image display apparatus having a large screen can be easily realized.

The electric connection between the signal lines of the array boards and the connection lines (or wiring region) on the opposite board can be attained by a plurality of conductive grains or conductive projecting members provided in the peripheries of the array boards. In particular, reductions in the area of the display surface caused by positioning of connecting regions can be eliminated if the signal lines and the connection lines are electrically connected with each other through frame-like sealing members made of anisotropic conductive resin or conductive grains or conductive projecting members provided in frame-like sealing members made of transparent resin.

In addition, the insulating layer on which a wiring layer as connection lines is formed may be made of transparent resin having a transparency of 80% or more over a range of wavelength of 500 nm to 800 nm. By providing connection lines (or a multi-layer wiring region) on an insulating layer made of such BCB resin, the transparency at a display region where the multi-layer wiring region is positioned can be improved much more. In addition, since BCB resin has a dielectric constant of 3.5 or less, it is possible to prevent deformation of waveforms of signals and delays of signals due to the connection lines (or multi-layer wiring region). As a result of this, it is possible to eliminate problems caused by elongating the leading distances of the signal lines.

Further, the transparency of the frame-like sealing members can be improved by forming the frame-like sealing members from transparent resin such as BCB resin or the like which has a transparency of 80% or more over a range of wavelength of 500 nm to 800 nm. Further, the opposite board and the array boards can be rigidly connected with each other by hardening the frame-like sealing members made of BCB resin not yet hardened. As a result of this, even if the width of each frame-like sealing member is set to be as narrow as 1 mm or less, the opposite board and the array boards can be excellently connected with each other. Therefore, the transparency of the frame-like sealing members on the display surface can be improved, and the display characteristics can further be improved by reducing the area of the sealing members.

The present invention is described in more detail by reference to the following preferred embodiments.
(Embodiment 1)

FIGS. 1A and 1B are schematic sectional views showing steps of manufacturing an image display apparatus according to an embodiment 1 of the present invention. FIG. 2 is a plan view of an image display apparatus thus manufactured.

At first, ITO films each having a thickness of 300 nm were respectively formed on both surface of a transparent substrate 21 having a thickness of 0.7 mm made of, for example, glass. On each of the ITO films, a resist was coated by a roll coater and a resist pattern was formed thereon by a photo-etching method. With the resist patterns used as masks, the ITO films were selectively etched to form electrode patterns (or common electrodes) 22. An opposite board 23 was thus prepared.

Further, an ITO film having a thickness of 300 nm was formed on one surface of a transparent substrate 24 having a thickness of 0.7 mm and made of, for example, glass. A resist was coated on the ITO film by a roll coater, and a resist pattern was formed thereon by a photo-etching method. With the resist pattern used as a mask, the ITO film was selectively etched to form a signal line pattern 25 on the surface of the transparent substrate 24, and further, a polysilicon gate type TFT (not shown) was formed as a semiconductor element. Two array boards 26a and 26b were thus prepared.

In the next, ultraviolet-hardened resin containing epoxy resin as a main component was coated on the surfaces of the opposite board 23 with use of a dispenser and was temporarily dried at 80° C., so that a rectangular frame-like sealing member 27a having an opening portion for injecting liquid crystal which was not yet hardened was formed in the side of an end portion of the opposite board 23. Subsequently, a plurality of spacers 28a having an average grain diameter of 5 μm and made of styrene resin were splayed on a region of the surface of the opposite board 23 which was surrounded by the frame-like sealing member 27a not yet hardened, and the array board 26a already prepared was positioned on the frame-like sealing member 27a and the spacer 28a. Subsequently, ultraviolet light is irradiated from the side of the array 26a to harden the frame-like sealing member 27a made of ultraviolet-hardened resin not yet hardened. After the hardening, the frame-like sealing member 27a had a thickness of 5 μm, an average width 30 μm, and a transparency of 90% or more over the visible wavelength range. Liquid crystal 29a was injected through the opening portion of the frame like sealing member 27a, and thereafter, the opening portion was closed with ultraviolet-hardened resin similar to the above resin, to enclose the liquid crystal 29a. Through these steps, a surface side display region 30a was prepared as shown in FIG. 1A.

In the next, a frame-like sealing member 27b not yet hardened and having an opening portion for injecting liquid crystal was formed on the back surface of the opposite board 23 opposite to the array board 26a, in the same steps as in the above steps of preparing the display region 30a. A plurality of spacers 28b having an average grain diameter of 5 μm and made of transparent resin were splayed on a portion of the back surface of the opposite board 23 surrounded by the frame-like sealing member 27b. The other array board 26b already prepared was positioned on the frame-like sealing member 27b and the spacers 28b, and ultraviolet light was irradiated from the side of the array board 26b, to harden the above-mentioned frame-like sealing member 27b not yet hardened. After the hardening, the frame-like sealing member 27b had a thickness of 5 μm, an average width of 30 μm, and a transparency of 90% or more over a visible wavelength range. Subsequently, liquid crystal 29b was injected through the opening portion of the frame-like sealing member 27b, and thereafter, the opening portion was closed with the same ultraviolet-hardened resin as described above, to enclose the liquid crystal 29b. In these steps, a display region 30b of the back side was prepared as shown in FIG. 1B. An image display apparatus was thus manufactured.

The image display apparatus according to the embodiment 1 comprises an opposite board 23 in which ITO common electrodes 22 each having a thickness of 300 mm are respectively formed on both surfaces of a transparent substrate 21 having a thickness of 0.7 mm, and array boards 26a and 26b in each of which a polysilicon gate TFT (not shown) and an ITO signal line 25 having a thickness of 300 nm are formed on one surface of a transparent substrate 24 having a thickness of 0.7 mm, as shown in FIG. 1B and FIG. 2. The array boards 26a and 26b are respectively arranged on both surfaces of the opposite board 23, such that the end portions of the display regions of the array boards 26a and 26b face each other a sandwich of the opposite board 23. Thus, viewed from the display surface side, the array boards 26a and 26b are arranged to be adjacent to each other, such that the array boards 26a and 26b are partially layered over each other, with the opposite board 23 arranged therebetween. Spacers 28a and 28b are respectively inserted in clearances between the opposite board 23 and the array boards 26a and 26b, and simultaneously, frame-like sealing members 27a and 27b made of transparent resin are also respectively formed in the clearances. Liquid crystal 29a is enclosed in a space surrounded by the opposite board 23, the array board 26a, and the frame-like sealing member 27a. Further, liquid crystal 29b is enclosed in a space surrounded by the opposite board 23, the array board 26b, and the frame-like sealing member 27b.

As shown in FIG. 1B and FIG. 2, the image display apparatus having this kind of structure, adjacent array boards 26a and 26b are arranged to be partially layered over each other, with an opposite board 23 arranged therebetween, viewed from the display surface side. One sealing member 27a positioned to be layered over both the display region 30a and 30b is compensated for by the display region 30b of the array board 26b, while the other sealing member 27b is compensated for by the display region 30a of the other array board 26a. Therefore, it is possible to realize a large screen in which a display-possible region corresponds to a region where two array boards 26a and 26b are provided (e.g., A1×B1 in FIG. 2).

Although frame-like sealing members 27a and 27b exists layered over both display areas 30a and 30b in a display-possible region, these sealing members 27a and 27b can be respectively compensated for by display areas formed by opposite array boards since the frame-like sealing members 27a and 27b are made of material which is transparent over the range of a visible wavelength. Therefore, a display-impossible region is completely eliminated within the display region.

(Embodiment 2)

FIG. 3 is a schematic sectional view showing an image display apparatus according to the embodiment 2 of the present invention. Note that the same components as explained in the above embodiment 1 and shown in FIG. 1B are denoted by the same references, and explanation of those components will be omitted herefrom.

In the image display apparatus according to the embodiment 2, auxiliary transparent boards 31a and 31b are respectively provided on the front and back surfaces of an opposite board 23, as shown in FIG. 3. The auxiliary board 31a is arranged to be adjacent to the array board 26a on the front surface of the opposite board 23 and is fixed with a frame-like sealing member 27 made of transparent resin and a plurality of spherical spacers 28 made of styrene resin such that the auxiliary board 31a and the array board 26a have surfaces in an equal plane. The auxiliary board 31b is arranged to be adjacent to the array board 26b on the back surface of the opposite board 23 and is fixed with a frame-like sealing member 27 made of transparent resin and a plurality of spherical spacers 28 made of transparent resin such that the auxiliary board 31b and the array board 26b have surfaces in an equal plane.

In the structure as described above, it is possible to realize an image display apparatus having a large display area in which no display-impossible region is formed in a display region, like the embodiment 1.

In addition, since auxiliary transparent boards 31a and 31b are provided, it is possible to avoid gaps which will otherwise be caused by arranging the array boards 26a and 26b displaced from each other. Therefore, an image display apparatus with a high strength can be realized.

Note that a thin metal oxide film or a resin film may be formed as an anti-reflection layer on the array board 26a and the auxiliary board 31a in the front surface side, to prevent irregular reflection hindering the view.

(Embodiment 3)

FIG. 4 is a schematic sectional view showing an image display apparatus according to the embodiment 3 of the present invention. Note that the same components as explained in the embodiment 1 and shown in FIG. 1B will be denoted by the same references, and explanation thereof will be omitted herefrom.

In the image display apparatus according to the embodiment 3, reflection plates 32a and 32b having a reflection ratio of, for example, 40 to 90% over a range of visible wavelength are respectively provided on a portion of the back surface of the opposite board 26a corresponding to the array board 26a in the front surface side, and on the transparent substrate 24 of the array board 26b in the back surface side.

In the structure as described above, it is possible to realize an image display apparatus having a large display area in which no display-impossible region is formed in a display region, like the embodiment 1.

In addition, an image display apparatus having a high contrast ratio can be realized since reflection plates 32a and 32b are provided.

(Embodiment 4)

FIG. 5 is a schematic sectional view showing an image display apparatus according to the embodiment 4 of the present invention. Note that the same components as explained in the above embodiment 1 and shown in FIG. 1B are denoted by the same references, and explanation of those components will be omitted herefrom.

In the image display apparatus according to the embodiment 2, auxiliary transparent boards 31a and 31b are respectively provided on the front and back surfaces of an opposite board 23, as shown in FIG. 5. The auxiliary board 31a is arranged to be adjacent to the array board 26a on the front surface of the opposite board 23 and is fixed with a frame-like sealing member 27 made of transparent resin and a plurality of spherical spacers 28 made of styrene resin such that the auxiliary board 31a and the array board 26a have surfaces in an equal plane. The auxiliary board 31b is arranged to be adjacent to the array board 26b on the back surface of the opposite board 23 and is fixed with a frame-like sealing member 27 made of transparent resin and a plural spherical spacers 28 made of transparent resin such that the auxiliary board 31b and the array board 26b have surfaces in an equal plane. Further, a reflection plate 32 having a reflection ratio of, for example, 40 to 90% over a range of visible wavelength is provided on the 41transparent substrate 24 of the array board 26b in the back surface side and the auxiliary board 31b in the back surface side.

In the structure as described above, it is possible to realize an image display apparatus having a large display area in which no display-impossible region is formed in a display region, like the embodiment 1.

In addition, since auxiliary transparent boards 31a and 31b are provided, it is possible to avoid gaps which will otherwise be caused by arranging the array boards 26a and 26b displaced from each other. Therefore, an image display apparatus with a high strength can be realized. Further, an image display apparatus having a high contrast ratio can be realized since a reflection plates 32 is provided.

(Embodiment 5)

FIG. 6 schematically shows a display region of an image display apparatus according to the embodiment 5 of the present invention.

As shown in FIG. 6, an array board 26a is provided in the front surface side of an opposite board not shown. Two array boards 26b1 and 26b2 are arranged on the back surface of the opposite board not shown, viewed from the display surface side, such that the two array boards 26b1 and 26b2 are adjacent to the array board 26a in the front surface side and such that the two array boards 26b1 and 26b2 respectively overlap the left and right ends of the array board 26a in the front surface side. A plurality of spacers, made of styrene resin, are respectively inserted in clearances between the opposite board and the array boards 26a, 26b1, and 26b2, and frame-like sealing members 27 are also respectively formed in the clearances. Liquid crystal is enclosed in a space surrounded by the opposite board, the array board 26a, and the frame-like sealing members 27. In addition, liquid crystal is also enclosed in spaces surrounded by the opposite board, the array boards 26b1 and 26b2, and the frame-like sealing members 27, respectively.

In the structure as described above, it is possible to an image display apparatus which has a display region of a large area equivalent to the size of A2×B2 in FIG. 6. Although the display region includes frame-like sealing members 27, these sealing members 27 can be compensated for by the display regions created by opposite array boards since the sealing members 27 are made of resin having a transparency over a range of visible wavelength. Therefore, a display-impossible region is completely eliminated within the display region.

(Embodiment 6)

Figure 7:
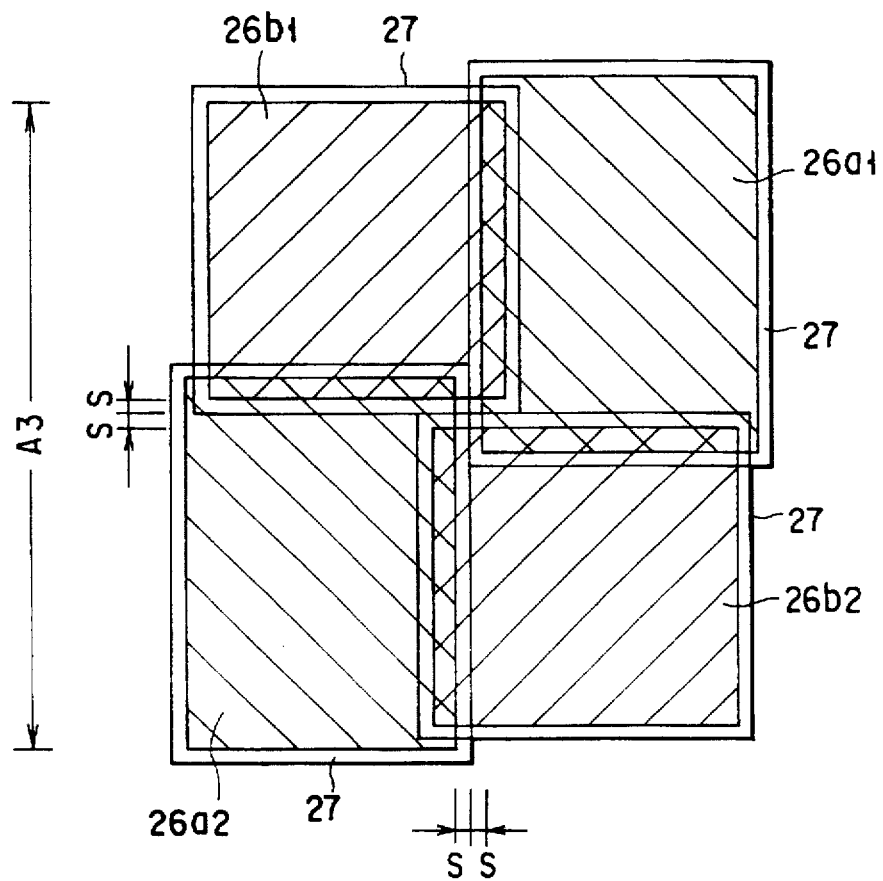
FIG. 7 is a view schematically showing a display region of an image display apparatus according to an embodiment 6 of the present invention.

FIG. 7 schematically shows the display region of an image display apparatus according to the embodiment 6 of the present invention.

As shown in FIG. 7, two array boards 26a1 and 26a2 positioned on a diagonal line extending in the right upper direction in the figure are provided in the front surface side of an opposite board not shown. Two array boards 26b1 and 26b2 are positioned on a diagonal line extending in the left upper direction in the figure, in the back surface side of the opposite board not shown. Viewed from the display surface side, the left array board 26b1 is arranged to be adjacent to the array boards 26a1 and 26a2 in the front surface side, such that the right and lower edges of the array board 26b1 respectively overlap the array boards 26a1 and 26a2 positioned on the diagonal line extending in the right upper direction. The lower array board 26b2 among the two array boards positioned on the diagonal line extending in the left upper direction is arranged to be adjacent to the array boards 26a1 and 26a2 in the front surface side, such that the left and upper edges of the array board 26b2 respectively overlap the array boards 26a1 and 26a2 positioned on the diagonal line extending in the right upper direction. A plurality of spacers, made of styrene resin, are respectively inserted in clearances between the opposite board and the array boards 26a1, 26as, 26b1, and 26b2, and frame-like sealing members 27 made of transparent resin are also respectively formed in the clearances. Liquid crystal is enclosed in each of spaces surrounded by the opposite board, the array boards 26a1 and 26a2, and the frame-like sealing members 27. Also, liquid crystal is enclosed in each of spaces surrounded by the opposite board, the array boards 26b1 and 26b2, and the frame-like sealing members 27.

In the structure as described above, it is possible to realize a display region of a large area equivalent to the size of A3×B3 in FIG. 7. However, a display-impossible region remains in the center region where sealing members 27 overlap each other with an opposite board not shown inserted therebetween. In this case, a display-impossible region of an area of 2S×2S exists in the display region in one of the surface sides of the opposite board where each of the sealing members 27 has a width of S, even if the cutting precision of end surfaces of transparent substrates made of glass is set to about ±10 µm to eliminate clearances between adjacent sealing members 27. If the upper limit of the display region for one array board is set to a square of 30 inches, for example, the display region of the image display apparatus according to this embodiment 7 is as large as a square of 60 inches or so. With such a large screen, a sufficiently clear image can be obtained if only the size of each pixel is a square of about 1 mm. Accordingly, when each frame-like sealing member 27 has a width S of about 50 µm in case of an image display apparatus constructed by using pixels each having a size as described above, a display-impossible region per pixel having a size of a square of 100 to 120 µm is equivalent to only about 1.4% of the area of each pixel, and is negligibly small from a view point of image display.

In the image display apparatuses according to the embodiments 1 to 6, the insulating layer on which a polysilicon TFT semiconductor element is to be formed on an array board may be formed by coating and hardening a BCB resin precursor solution. The insulating layer thus made of BCB resin has a high transparency of 98% over a wavelength range of 500 to 800 mm, and it is therefore possible to improve the display characteristic with use of the TFT semiconductor element.

In addition, frame-like sealing members may be made of BCB resin in place of epoxy resin. A frame-like sealing member made of BCB resin is formed, for example, by coating and drying a BCB resin precursor solution on an opposite board or an array board to form a frame-like sealing member not yet hardened, by the opposite board and the array board are adhered on each other with the sealing member not yet hardened, and by thereafter performing baking at 250° C. for an hour and further at 350° C. for 30 minutes. After the baking, the frame-like sealing member made of BCB resin has a high transparency of 95% over a wavelength range of 500 to 800 nm. An image display apparatus using such frame-like sealing members has an improved transparency at the frame-like sealing members positioned in the display surface. In addition, the opposite board and the array boards can be rigidly connected with each other since the frame-like sealing members made of BCB resin are hardened. As a result, the opposite board and the array boards can be excellently connected with each other even when the width of each frame-like sealing member is set to 1 mm or less. Therefore, the transparency of the frame-like sealing members can be improved in the display surface, and simultaneously, the area of the display surface can be reduced to improve the display characteristics.

(Embodiment 7)

Figure 8A:
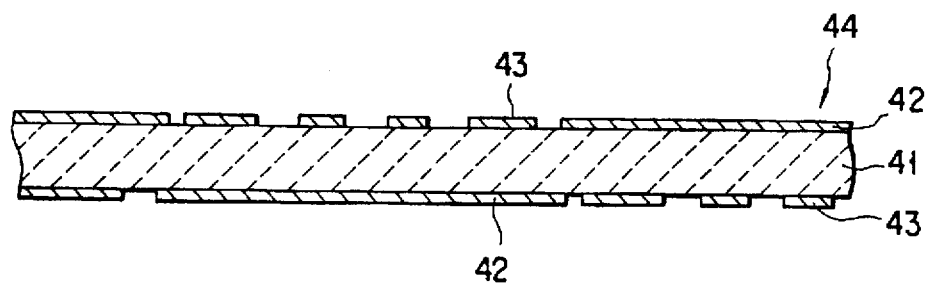
FIGS. 8A to 8C are schematic sectional views showing steps of manufacturing an image display apparatus according to an embodiment 7 of the present invention.
Figure 8B:
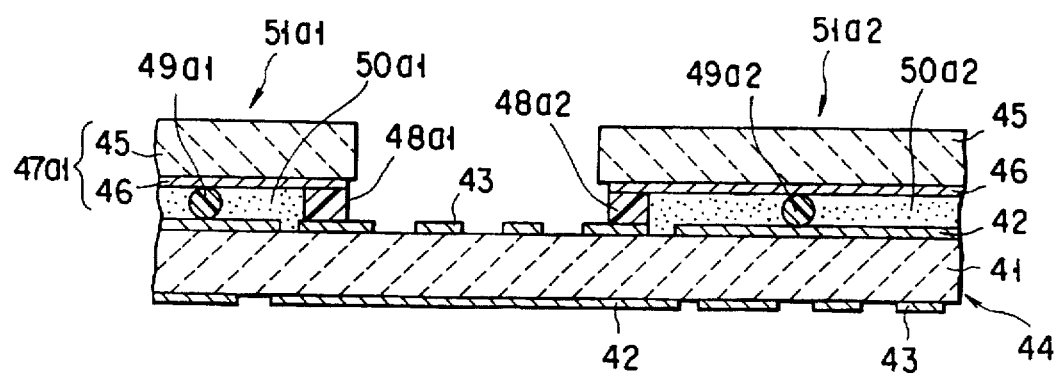
Figure 8C:
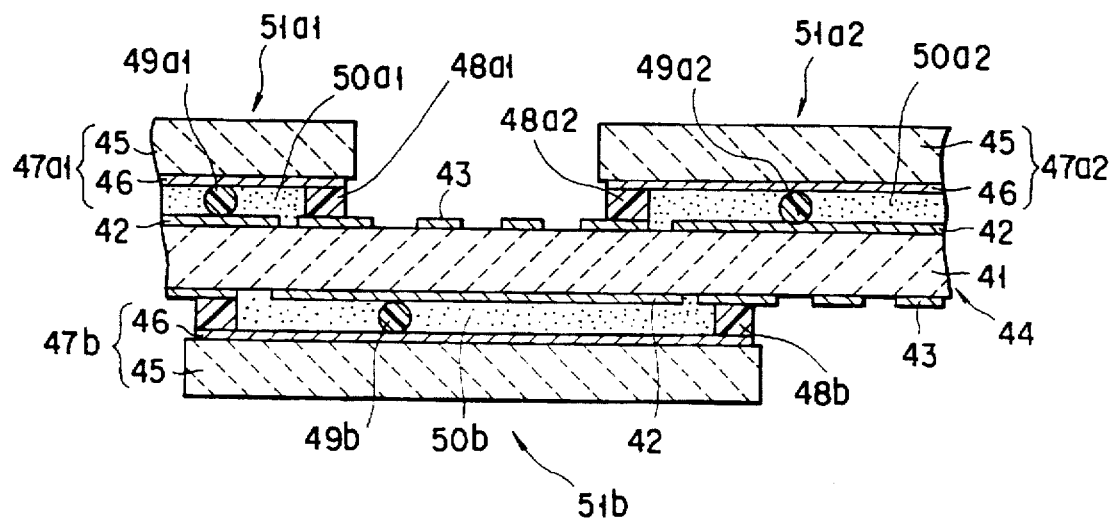
Figure 9:
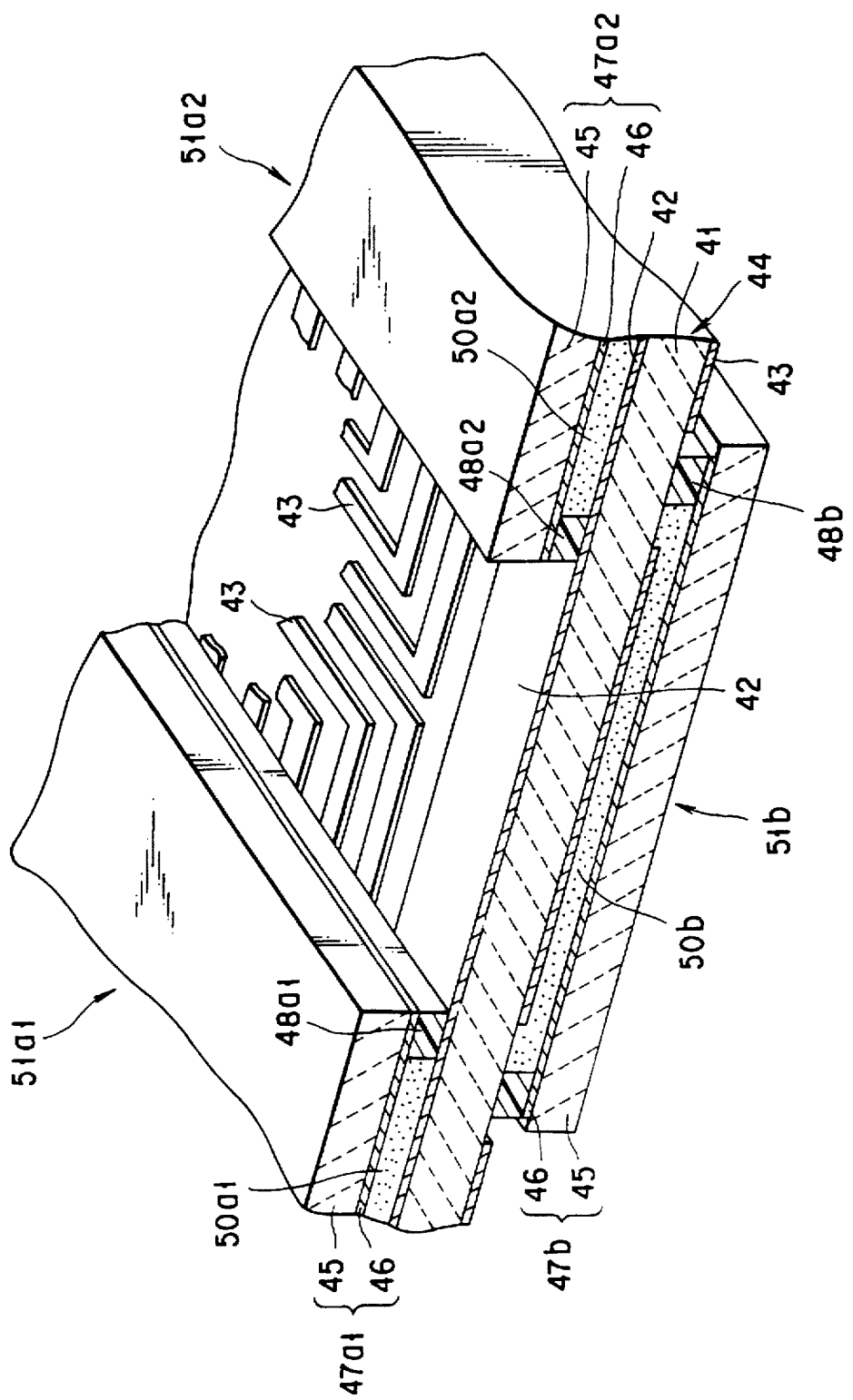
FIG. 9 is a partially cut-away perspective view of an image display apparatus obtained in accordance with the embodiment 7 of the present invention.

FIGS. 8A to 8C are schematic sectional views showing steps of manufacturing an image display apparatus according to the embodiment 7 of the present invention. FIG. 9 is a partially cut-away perspective view of an image display apparatus thus manufactured.

At first, ITO films each having a thickness of 300 nm were respectively formed on both surface of a transparent substrate 41 having a thickness of 0.7 mm made of, for example, glass. On each of the ITO films, a resist was coated by a roll coater and a resist pattern was formed thereon by a photo-etching method. With the resist patterns used as masks, the ITO films were selectively etched to form electrode patterns (or common electrodes) 42, a plurality of connection lines 43 extending in the X-direction, and a plurality of connection lines (not shown) extending in the Y-direction, respectively on both surfaces of the transparent substrate 41, as shown in FIG. 8A. An opposite board 44 was thus prepared.

Further, an ITO film having a thickness of 300 nm was formed on one surface of a transparent substrate 45 having a thickness of 0.7 mm and made of, for example, glass. A resist was coated on the ITO film by a roll coater, and a resist pattern was formed thereon by a photo-etching method. With the resist pattern used as a mask, the ITO film was selectively etched to form a plurality of signal lines 46 extending in the X-direction and a plurality of signal line (not shown) extending in the Y-direction, on the surface of the transparent substrate 45, and further, polysilicon gate type TFTs (not shown) were formed as semiconductor elements. Three array boards 47a1, 47a2, and 47b were thus prepared.

In the next, an anisotropic conductive resin is coated on a surface of the opposite board 44 with use of a dispenser, and is subjected to temporary drying at 80° C., so that rectangular frame-like sealing members 48a1 and 48a2 each having an opening portion for injecting liquid crystal which was not yet hardened was formed in the sides of end portions of the opposite board 44, respectively. Note that the anisotropic conductive resin has a composition in which fine conductive grains of resin beads whose average grain diameter is about 5 μm and whose surfaces are coated with ITO films are dispersed in ultraviolet-hardened resin containing epoxy resin as a main component. Subsequently, a plurality of spacers 49a1 and 49a2 having an average grain diameter of 5 μm and made of styrene resin were respectively splayed on regions on the surface of the opposite board 44 which were surrounded by the frame-like sealing members 48a1 and 48a2. The two array boards 47a1 and 47a2 already prepared were positioned on the frame-like sealing members 48a1 and 48a2 and the spacers 49a1 and 49a2, respectively. Subsequently, ultraviolet light is irradiated from the side of the array boards 47a1 and 47a2 to harden the frame-like sealing members 48a1 and 48a2 not yet hardened. After the hardening, the frame-like sealing members 48a1 and 48a2 each had a thickness of 5 μm, an average width of 30 μm, and a transparency of 82% or more over the visible wavelength range. In addition, the plurality of signal lines 46 on the array boards 47a1 and 47a2 were connected with the plurality of connection lines 43 on the opposite board 44, by the frame-like sealing members 48a1 and 48a2 made of the anisotropic conductive resin, respectively. The connection resistance was 30 mΩ per signal line, and thus, excellent electric connection was obtained. Thereafter, liquid crystal 50a1 and 50a2 were injected through the opening portions of the frame-like sealing members 48a1 and 48a2, and thereafter, the opening portions were enclosed by the same ultraviolet-hardening resin as above, to enclose the liquid crystal 50a1 and 50a2. Through these steps, display regions 51a1 and 51a2 in the surface side were prepared as shown in FIG. 8B.

In the next, a frame-like sealing member 47b not yet hardened, which is made of anisotropic conductive resin and has an opening portion for injecting liquid crystal, was formed on the back surface of the opposite board 44 opposite to the array boards 47a1 and 47a2, in the same steps as in the above steps of preparing the display regions 51a1 and 51a2. A plurality of spacers 49b having an average grain diameter of 5 μm and made of styrene resin were splayed on a portion of the back surface of the opposite board 44 surrounded by the frame-like sealing member 48b, respectively. The other array board 47b already prepared was positioned on the frame-like sealing member 48b and the spacers 49b. Ultraviolet light was irradiated from the side of the array board 47b, to harden the above-mentioned frame-like sealing member 48b not yet hardened, which was made of above-mentioned anisotropic conductive resin of a type which is hardened by ultraviolet light. After the hardening, the frame-like sealing member 48b had a thickness of 5 μm, an average width of 30 μm, and a transparency of 82% or more over a visible wavelength range. In addition, the plurality of signal lines 46 on the array board 47b were connected with the plurality of connection lines 43 on the opposite board 44 by the frame-like sealing member 48b made of above-mentioned anisotropic conductive resin, respectively. The connection resistance was 30 mΩ per signal line, and thus, excellent electric connection was obtained. Subsequently, liquid crystal 50b was injected through the opening portion of the frame-like sealing member 48b, and thereafter, the opening portion was closed with the same ultraviolet-hardened resin as described above, to enclose the liquid crystal 50b. In these steps, a display region 51b in the back side was prepared as shown in FIG. 8C. An image display apparatus was thus manufactured.

The image display apparatus according to the embodiment 7 comprises an opposite board 44 in which ITO common electrodes 22 each having a thickness of 300 mm and a plurality of connection lines 43 are formed on each of both surfaces of a transparent substrate 41 having a thickness of 0.7 mm, and array boards 47a1, 47a2, and 47b in each of which a polysilicon gate TFT (not shown) and a plurality of ITO signal lines 46 each having a thickness of 300 nm are formed on one surface of a transparent substrate 45 having a thickness of 0.7 mm, as shown in FIG. 8C and FIG. 9. The array boards 47a1 and 47a2 are arranged on the surface of the opposite board 44 at a predetermined interval, and the array board 47b is arranged on the back surface of the opposite board 44, such that both end portions of the array board 47b respectively face those end portions of the array boards 47a1 and 47a2 that are opposed to each other a sandwich of the opposite board 44. In other words, viewed from the display surface side, the array boards 47a1 and 47a2 in the front surface side and the array board 47b in the back surface side are arranged to be adjacent to each other, such that those end portions of the array boards 47a1 and 47a2 which face each other respectively overlap both end portions of the array board 47b in the back surface side, with the opposite board 44 arranged between the boards 47a1 and 47a2 and the board 47b.

A plurality of spacers 49a1 and 49a2 are respectively inserted in clearances between the opposite board 44 and the array boards 47a1 and 47a2. In addition, frame-like sealing members 48a1 and 48a2 made of transparent resin containing fine conductive grains are also respectively formed in the clearances, and a plurality of signal lines 46 on the array boards 47a1 and 47a2 are respectively connected with a plurality of connection lines 43 on the opposite board 44 by the frame-like sealing members 48a1 and 48a2. Specifically, the frame-like sealing members 48a1 and 48a2 have electric conductivity in their thickness directions, at contact portions between the plurality of signal lines 46 on the array board 47a1 and 47a2 and the plurality of connection lines 43 on the opposite board 44, but do not have electric conductivity in the direction perpendicular to the thickness direction (e.g., the plane direction of the opposite electrode 44). Therefore, the frame-like sealing members 48a1 and 48a2 are conductive only at the contact portions, so that the plurality of signal lines 46 on the array boards 47a1 and 47a2 and the plurality of connection lines 43 can be connected independently with each other. Liquid crystal 50a1 and 50a2 are respectively enclosed in spaces between the opposite board 44 and the array boards 47a1 and 47a2, surrounded by surrounded by the frame-like sealing members 48a1 and 48a2.

A plurality of spacers 49b are respectively inserted in a clearance between the opposite board 44 and the array board 47b. A frame-like sealing member 48b made of transparent anisotropic conductive resin containing fine conductive grains is formed in a clearance between the opposite board 44 and the array board 47b, and a plurality of signal lines 46 on the array board 47b are connected with a plurality of connection lines 43 on the opposite board 44 by the frame-like sealing member 48b. In addition, liquid crystal 50b is enclosed in a space between the opposite board 44 and the array board 47b, surrounded by the frame-like sealing member 48b.

As shown in FIG. 8C and FIG. 9, in the image display apparatus having the structure as described above, the array boards 47a1 and 47a2 and the array board 47b adjacent thereto with the opposite board 23 arranged therebetween are arranged such that end portions of these boards overlap each other, viewed from the display surface side. The frame-like sealing members 48a1 and 48a2 positioned in the front surface side between the front surface side display regions 51a1 and 51a2 and the back surface side display region 52b are compensated for by the display region 51b of the array board 47b in the back surface side. The frame-like sealing member 48b in the back surface side is compensated for by the display regions 51a1 and 51a2 of the array boards 47a1 and 47a2 in the front surface side. Therefore, it is possible to realize a large screen in which a display-possible region corresponds to a region where three array boards 47a1, 47a2, and 47b are provided (e.g., A1×B1 in FIG. 2).

Although frame-like sealing members 48a1, 48a2, and 48b exist positioned between the front surface side display regions 51a1 and 51a2 and the back surface side display region 51b in the display-possible region, these frame-like sealing members 48a1, 48a2, 48b can be compensated for by the display regions formed by the array boards in the opposite side, since the frame-like sealing members 48a1, 48a2, and 48b are made of material which is transparent over the range of visible wavelength. Therefore, a display-impossible region is completely eliminated within the display region.

In addition, the frame-like sealing members 48a1 and 48a2 enclosing liquid crystal 50a1 and 50a2 and made of anisotropic conductive resin are respectively formed in clearances between the opposite board 44 and the front surface side array boards 47a1 and 47a2, thereby connecting a plurality of signal lines 46 on the array boards 47a1 and 47a2 with a plurality of connection lines 43 on the opposite board 44, respectively. The frame-like sealing member 48b enclosing the liquid crystal 50b and made of anisotropic conductive resin is formed in a clearance between the opposite board 44 and the back surface side array board 47b, thereby connecting a plurality of signal lines 46 on the array board 47b with a plurality of connection lines 43 on the opposite board 44, respectively. Therefore, it is possible to realize an image display apparatus in which the array boards 47a1, 47a2, and 47b can be driven at an end portion through the connection lines 43 on the opposite board 44.

FIG. 10 schematically shows layout of nine array boards (including five array boards in the front surface side and four array boards in the back surface side) having a structure according to the embodiment 7 and leading of signal lines thereof. In an image display apparatus having this structure, a plurality of signal lines extending in X- and Y-directions are respectively led from the end portions of the array boards $47_1$ to $47_4$ positioned at four corners in the front surface side. Lines from the array board $47_5$ positioned in the center are led to end portions through a plurality of connection lines extending in the X- and Y-directions and respectively provided in empty spaces in the left and lower sides of the array board $47_5$. As a result of this, all array boards can be excellently driven even when a plurality of array boards are adhered in a matrix.

(Embodiment 8)

FIG. 11 is a schematic sectional view showing an image display apparatus according to the embodiment 8 of the present invention. Note that the same components as those explained in the embodiment 7 and shown in FIG. 8C and FIG. 9 are denoted by the same references, and explanation of those components will be omitted herefrom.

As shown in FIG. 11, an insulating layer 52a having a thickness of 500 nm and made of $SiO_2$ is covered over a portion of a common electrode 42 positioned between the array boards 47a1 and 47a2 in the front surface side. A plurality of connection lines 53a are formed on the insulating layer 52a, respectively. The frame-like sealing members 48a1 and 48a2 made of transparent anisotropic conductive resin in which fine conductive grains are dispersed are respectively formed in clearances between the opposite board 44 and the array boards 47a1 and 47a2, thereby connecting a plurality of signal lines 46 on the array board 47a1 and 47a2 with a plurality of connection lines 53a on the insulating layer 52a of the opposite board 44. In addition, insulating layers 52b made of $SiO_2$ and having a thickness of, for example, 500 nm are respectively covered on portions of a common electrode 42 positioned at both end portions of the array board 47b in the back surface side. The plurality of connection lines 53b are respectively formed on the insulating layers 52b. A frame-like sealing member 48b made of transparent anisotropic conductive resin containing fine conductive grains is formed in a clearance between the opposite board 44 and the array board 47b, thereby connecting a plurality of signal lines 46 on the array board 47b with a plurality of connection lines 53b on the insulating layer 52b of the opposite board 44.

According to the structure as described above, it is possible to realize an image display apparatus having a large screen in which display-impossible regions are not formed in the display region and the display-possible region of the screen corresponds to a region where three array boards 47a1, 47a2, and 47b are provided.

In addition, a plurality of signal lines 46 on the array boards 47a1 and 47a2 are connected with a plurality of connection lines 53a on the insulating layer 52a of the opposite board 44, respectively, by frame-like sealing members 48a1 and 48a2 made of anisotropic conductive resin. A plurality of signal lines 46 on the array board 47b are connected with a plurality of connection lines 53b on the insulating layer 52b of the opposite board 44, respectively, by a frame-like sealing member 48b made of anisotropic conductive resin. As a result of this, it is possible to realize an image display apparatus in which the array boards 47a1, 47a2, and 47b can be driven from end portions through the connection lines 53a and 53b on the opposite board 44.

(Embodiment 9)

Figure 12:
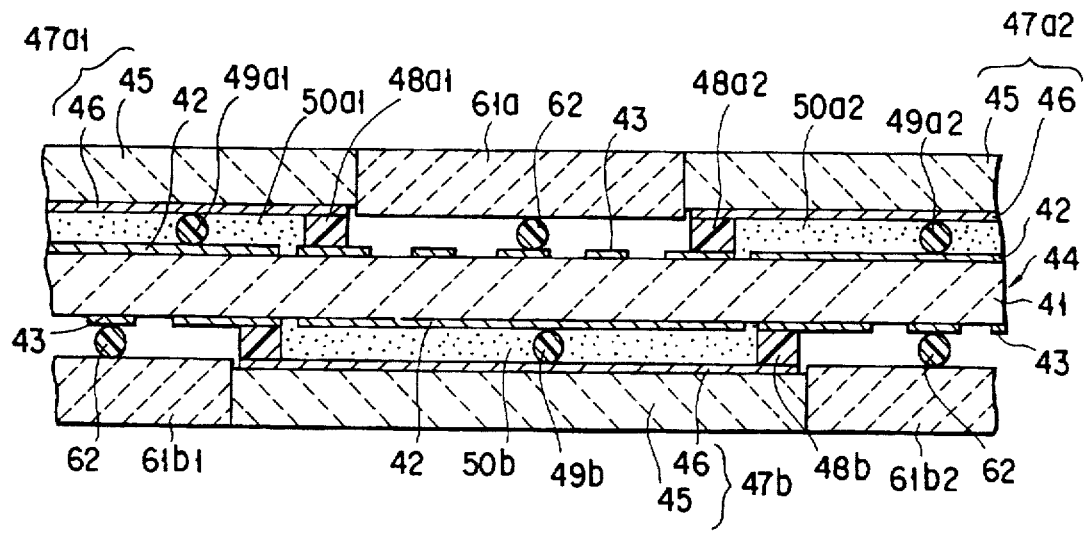
FIG. 12 is a schematic sectional view showing an image display apparatus according to an embodiment 9 of the present invention.

FIG. 12 is a schematic sectional view showing an image display apparatus according to the embodiment 9 of the present invention. Note that the same components as explained in the above embodiment 7 and shown in FIG. 8C and FIG. 9 are denoted by the same references, and explanation of those components will be omitted herefrom.

In the image display apparatus according to the embodiment 9, an auxiliary transparent board 61a made of, for example, glass is arranged to be adjacent to the array boards 47a1 and 47a2 on the surface of the opposite board 44, and is fixed with a plurality of spherical spacers 49 made of styrene resin inserted, such that the array boards 47a1 and 47a2 have made of transparent resin such that the auxiliary board 61a and the array boards 47a1 and 47a2 have surfaces in an equal plane. Auxiliary transparent boards 61b1 and 61b2 are arranged to be adjacent to the array board 47b on the back surface of the opposite board 44, and are fixed with spherical spacers 62 made of styrene resin inserted, respectively, such that the auxiliary boards 61b1 and 61b2 and the array board 47b have surfaces in an equal plane.

In the structure as described above, it is possible to realize an image display apparatus having a large display area in which no display-impossible region is formed in a display region, like the embodiment 7.

In addition, since auxiliary boards 61a, 61b1, and 61b2 are provided, it is possible to avoid gaps which will otherwise be caused by arranging the array boards 47a1, 47a2, and 47b displaced from each other. Therefore, an image display apparatus with a high strength can be realized.

Note that a thin metal oxide film or resin film may be formed as an anti-reflection layer on the surface of each of the array boards 47a1 and 47a2 and the auxiliary board 61a in the display surface side, to prevent irregular reflection hindering the view.

(Embodiment 10)

Figure 13:
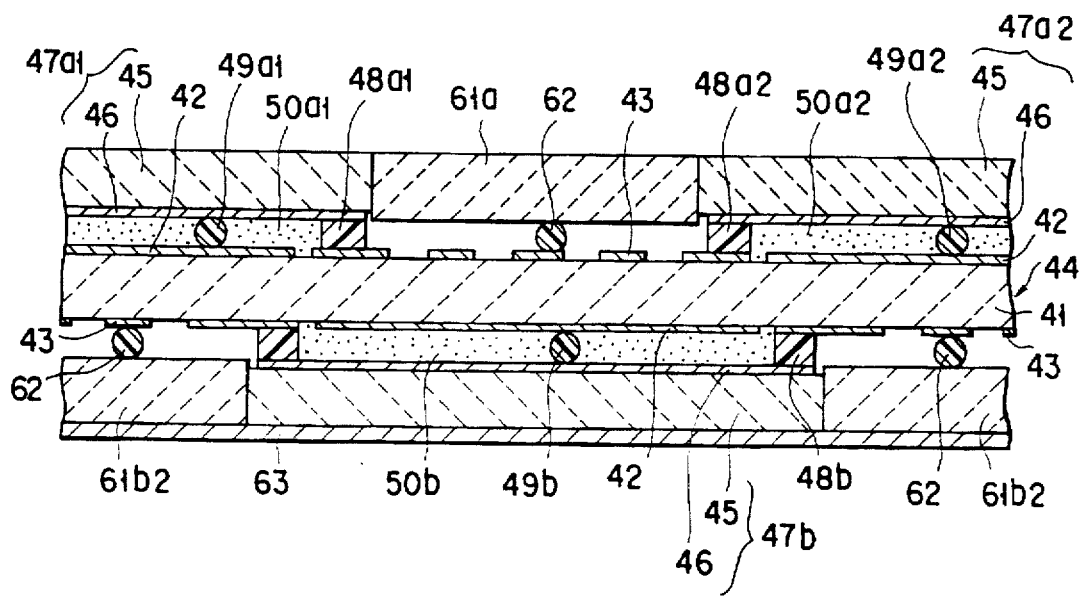
FIG. 13 is a schematic sectional view showing an image display apparatus according to an embodiment 10 of the present invention.

FIG. 13 is a schematic sectional view showing an image display apparatus according to the embodiment 10 of the present invention. Note that the same components as explained in the embodiment 7 and shown in FIG. 8C and FIG. 9 will be denoted by the same references, and explanation thereof will be omitted herefrom.

In the image display apparatus according to the embodiment 10, an auxiliary transparent board 61a made of, for example, glass is fixed on the surface of the opposite board 44 with a plurality of spherical spacers 49 made of styrene resin inserted, such that the auxiliary board 61a is adjacent to the array boards 47a1 and 47a2 and has a surface in a plane equal to the surfaces of the array boards 47a1 and 47a2. Auxiliary boards 61b1 and 61b2 are fixed on the back surface of the opposite board 44 with a plurality of spherical spacers 62 made of styrene resin inserted, such that the auxiliary boards 61b1 and 61b2 is adjacent to the array board 47b and have surfaces in a plane equal to the surface of the array board 47b. A reflection plate 63 is provided over the transparent substrate 45 and the auxiliary boards 61b1 and 61b2, in the back surface side of the opposite board 44.

In the structure as described above, it is possible to realize an image display apparatus having a large display area in which no display-impossible region is formed in a display region, like the embodiment 7. In addition, it is possible to realize an image display apparatus in which array boards positioned inside can be driven from end portions.

In addition, since auxiliary boards 61a, 61b1, and 61b2 are provided, it is possible to avoid gaps which will otherwise be caused by arranging the array boards 47a1, 47a2, and 47b are displaced from each other. Therefore, an image display apparatus with a high strength can be realized.

In addition, an image display apparatus having a high contrast ratio can be realized since a reflection plate 63 is provided.

(Embodiment 11)

Figure 14A:
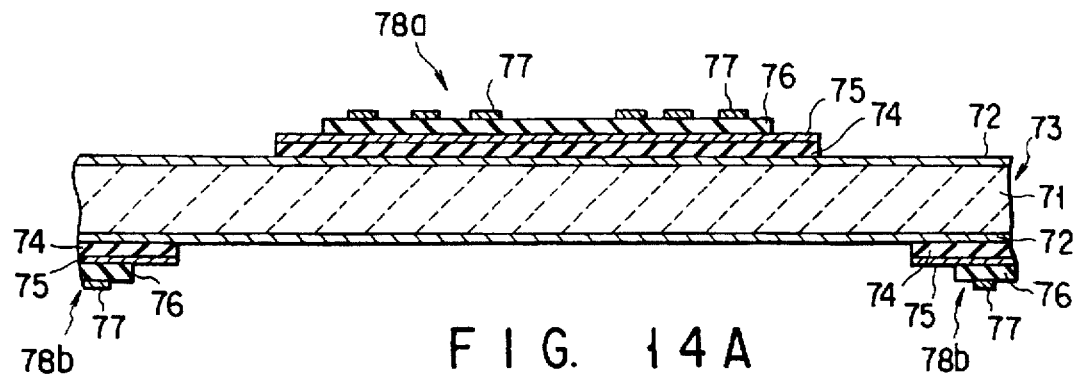
FIGS. 14A to 14C are sectional views showing steps of manufacturing an image display apparatus according to an embodiment 11 of the present invention.
Figure 14B:
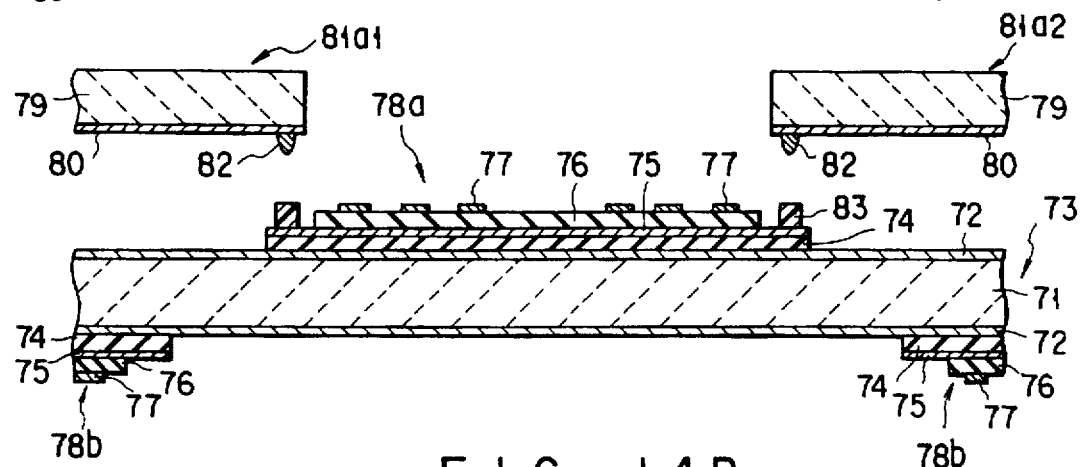
Figure 14C:
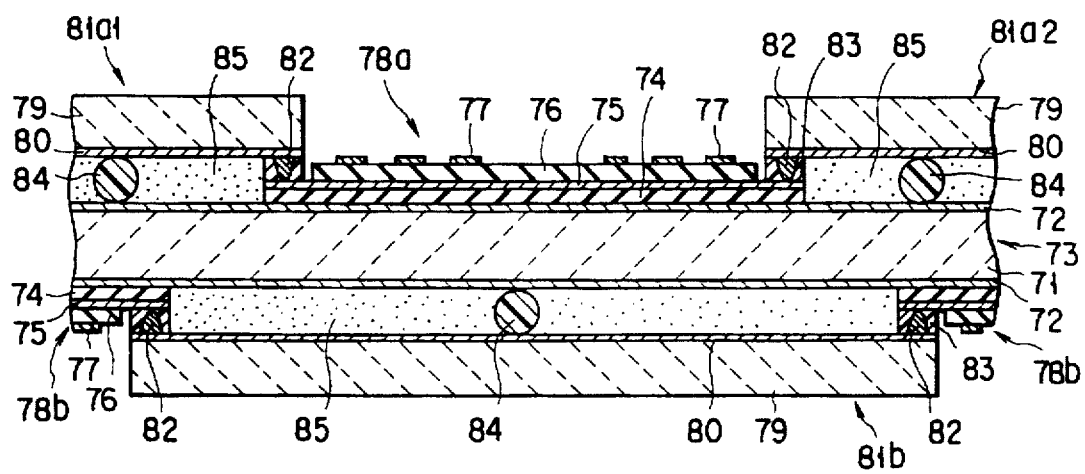
Figure 15:
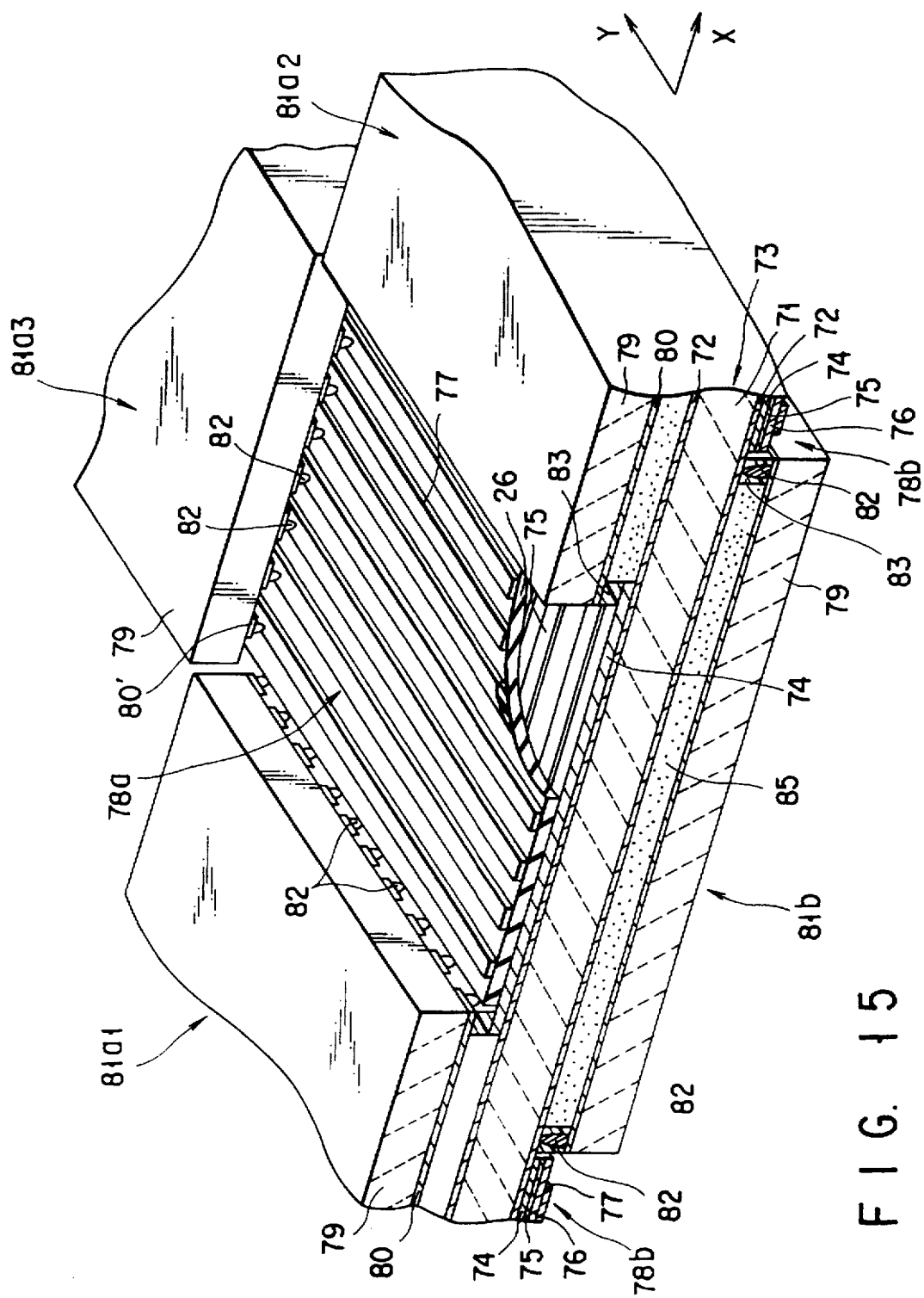
FIG. 15 is a partially cut-away perspective view showing an image display apparatus obtained in accordance with the embodiment 11.

FIGS. 14A to 14C are schematic sectional views showing steps of manufacturing an image display apparatus according to the embodiment 11 of the present invention. FIG. 15 is a partially cut-away perspective view of an image display apparatus thus manufactured.

At first, ITO films each having a thickness of 300 nm were respectively formed on both surface of a transparent substrate 71 having a thickness of 0.7 mm and made of, for example, glass by a sputtering method, to form an opposite board having common electrodes 72. On each of the common electrodes 72, a BCB resin precursor solution was coated by a roll coater. The coating was subjected to temporary curing. Thereafter, ultraviolet light was irradiated through a mask, and unnecessary portions were removed by an organic-based special developer solution (commercial name DS-2100 available at Dow Chemical Corporation), to form a desired resin pattern. The resin pattern was subjected to baking at 250° C. for an hour, and further to baking at 350° C. for 30 minutes, thereby to form a first insulating layer 74 having a thickness of 1 μm and a transparency of 98% over a wavelength range of 500 nm to 800 nm. On the first insulating layer 74, a Mo film and an Al film were formed sequentially by a sputtering method, and thereafter, these metal films were subjected to patterning, to form first connection lines 75 extending in the X-direction, each of which had projecting electrode connection portions at its end portions in the X-direction. On the first insulating layer 74 including the connection lines 75, a second insulating layer 76 made of BCB resin was formed in the same manner as in the case of forming the first insulating layer 74. Further, on the second insulating layer 76, second connection lines 77 extending in the Y-direction, which had projecting electrode connection portions at its end portions, were formed in the same manner as in the case of forming the connection lines 75 extending in the X-direction. As shown in FIG. 14A, a multi-layer wiring region 78a was thus formed. Multi-layer wiring regions 78b were formed on the back surface of the opposite board 73 in the same manner as in case of forming the multi-layer wiring region 78a. Note that the multi-layer wiring regions 78a and 78b may be simultaneously formed on both the front and back surfaces of the opposite board 73.

In the next, an insulating layer (not shown) made of BCB resin was formed on a surface of a transparent substrate 79 having a thickness of 0.7 mm and made of, for example, glass, in the same manner as in case of forming the first insulating layer as mentioned-above, and thereafter, an ITO film having a thickness of 300 nm was formed by a sputtering method. A resist was coated on the ITO film by a roll coater, and a resist pattern was formed thereon by a photo-etching method. With the resist pattern used as a mask, the ITO film was selectively etched to form a plurality of signal lines 80 extending in the X-direction and a plurality of signal lines (not shown) extending in the Y-direction, on the insulating layer on the surface of the transparent substrate 79, and further, polysilicon gate type TFTs (not shown) were formed as semiconductor elements. In this manner, three array boards 81a1, 81a2, and 81b were thus previously prepared. Subsequently, on each of the array boards 81a1, 81a2, and 81b, a plurality of projecting electrodes 82 each consisting of Au ball bump having a size of 25 μm×25 μm and a height of 4 μm were respectively formed on end portions of the signal lines extending in the X- and Y-directions. Each projecting electrode 82 had a conical top end. Subsequently, with use of a dispenser, a BCB resin precursor solution was coated on those portions of the connection lines 75 extending in the X-direction which were positioned at end portions of the first insulating layer 74 of the opposite board 73, and was also coated on those portions of the connection lines 77 extending in the Y-direction which were positioned at end portions of the second insulating layer 76. The coated BCB resin precursor solutions were subjected to temporary curing at 80° C. for 20 minutes, to form frame-like sealing members 83 not yet hardened, each of which has a width of 50 μm, as shown in FIG. 14B. Note that opening portions (not shown) for injecting liquid crystal as described later were formed in the frame-like sealing members 83.

In the next, a plurality of spacers 84 made of styrene resin having an average grain diameter of 5 μm were splayed at positions in the sides of the array boards from the frame-like sealing members 83 not yet hardened, on the opposite board 73, respectively. The array boards 81a1 and 81a2 were positioned on the front surface side of the opposite board 73, respectively, such that the projecting electrodes 82 face the sealing member 83. Thereafter, the array boards 81a1 and 81a2 were pressed to the opposite board 73, respectively. In this state, the projecting electrodes 82 of the array boards 81a1 and 81a2 bit into the frame-like sealing members 83 made of BCB resin not yet hardened and having a flexibility, and had contact with electrode leading portions of the connection lines 75 and 77 extending in the X- and Y-directions on the opposite board 73, respectively, thereby making electric connection. Subsequently, baking was performed at 250° C. for an hour and further at 350° C. for 30 minutes, so that the frame-like sealing members 83 made of BCB resin as described above were hardened to mechanically fix the array boards 81a1 and 81a2 on the opposite board 73, respectively. Simultaneously, the projecting electrodes 82 made of Au ball bumps and the uppermost Al film (not shown) on the connection lines extending in the Y-direction in the multi-layer wiring region 78a made a solid phase diffusion reaction, so that excellent electric connection was ensured with high reliability. After the baking, the frame-like sealing member 83 had a transparency of 95% over a wavelength range of 500 nm to 800 nm. Subsequently, liquid crystal 85 was injected through each of opening portions (not shown) previously provided in the frame-like sealing members 83, and BCB resin precursor was filled in the opening portion. Thereafter, baking was performed at 250° C. for an hour to harden the precursor. Note that a heater head may have a selective contact with the precursor to locally heat and harden the BCB resin filler, when baking the BCB resin filler. After the baking, the BCB resin filler has a transparency over a wavelength range of 500 nm to 800 nm. On the back surface of the opposite board 73, the array board 81b was fixed in the same manner as in the case of the array boards 81a1 and 81a2. Through these steps, an image display apparatus shown in FIG. 14C and FIG. 15 was manufactured.

The image display apparatus according to the embodiment 11 comprises an opposite board 73 in which ITO common electrodes 72 each having a thickness of 300 mm are respectively formed on both surfaces of a transparent substrate 71 having a thickness of 0.7 mm, and array boards 81a1, 81a2, and 81b in each of which a polysilicon gate TFT (not shown), signal lines 80 extending in the X-direction, and signal lines (not shown) extending in the Y-direction are formed on one surface of a transparent substrate 79 having a thickness of 0.7 mm, as shown in FIG. 14C and FIG. 15. Two array boards 81a1 and 81a2 are arranged on the surface of the opposite board 73 at a predetermined interval, and the array board 81b is arranged on the back surface of the opposite board 73, such that both end portions of the array board 81b respectively face those end portions of the array boards 81a1 and 81a2 that are opposed to each other a sandwich of the opposite board 73. In other words, viewed from the display surface side, the array boards 81a1 and 81a2 in the front surface side and the array board 81b in the back surface side are arranged to be adjacent to each other, such that those end portions of the array boards 81a1 and 81a2 which face each other respectively overlap both end portions of the array board 81b in the back surface side, with the opposite board 73 arranged between the boards 81a1 and 81a2 and the board 81b.

The multi-layer wiring region 78a is arranged on the surface of the common electrode 72 in the side opposite to the opposite board 73, with the array board 81b arranged. The multi-layer wiring region 78a comprises first and second insulating layers 74 and 76 each made of BCB resin having a transparency of 80% or more over a wavelength range of 500 nm to 800 nm, a plurality of X-direction connection lines 75 provided on the first insulating layer 74, and a plurality of Y-direction connection lines 77 provided on the second insulating layer 76. Frame-like sealing members 83 made of BCB resin having a transparency of 80% or more over a wavelength range of 500 nm to 800 nm are respectively formed in clearances between the opposite board 73 and the array boards 81a1, 81a2, and 81a3. A plurality of projecting electrodes 82 each consisting of Au bump formed on each of the array boards 81a1, 81a2, and 81b are positioned within the sealing member 83 and are connected with the first and second connection lines 75 and 77 of the multi-layer wiring region 78a. A plurality of spacers 84 are respectively inserted in clearances between the opposite board 73 and the array boards 81a1 and 81a2. Liquid crystal 85 is respectively enclosed in each of spaces surrounded by the sealing members 83, between the opposite board 73 and the array boards 81a1 and 81a2.

In addition, an array board 81b is fixed by a frame-like sealing member 83, in the back surface side of the opposite board 73, like in the front surface side as described above. A plurality of projecting electrodes 82 each consisting of Au bump formed on the array board 81b are positioned within the frame like sealing member 83, and are connected with the first and second connection lines 75 and 77 of the multi-layer wiring region 78b. A plurality of spacers 84 are inserted in a clearance between the opposite board 73 and the array board 81b, respectively. Liquid crystal 85 is enclosed in a space surrounded by the frame-like sealing member 83 between the opposite board 73 and the array board 81b.

According to the structure as described above, the array boards 81a1 and 81a2 and the array board 81b arranged to be adjacent thereto with the opposite board 73 arranged therebetween are arranged such that end portions of these boards overlap each other, viewed from the display surface side. The frame-like sealing members 83 in the front surface side are compensated for by the display region of the array board 81b in the back surface side. The frame-like sealing member 83 in the back surface side is compensated for by the display regions of the array boards 81a1 and 81a2 in the front surface side. In addition, the first and second insulating layers 74 and 76 forming part of the multi-layer wiring regions 78a and 78b, the insulating layers (not shown) of the array boards 81a1, 81a2, and 81b, and the frame-like sealing members 83 are all made of BCB resin having a transparency of 95% or more with respect to a wavelength range of 500 nm to 800 nm. As a result of this, no display-impossible region is formed in the display regions, so that it is possible to realize an image display apparatus having a large screen in which the display-possible region corresponds to a region where a plurality of array boards are provided.

A plurality of signal lines 80 extending in the X-direction in the array boards 81a1 and 81a2 are connected through projecting electrodes 82 with a plurality of first connection lines 75 extending in the X-direction in the multi-layer wiring region 78a on the opposite board 73, and a plurality of signal line 80' extending in the Y-direction are connected through projecting electrodes 82 with a plurality of second connection lines 77 extending in the Y-direction in the multi-layer wiring region 78a on the opposite board 73. Likewise, a plurality of signal lines extending in X- and Y-directions on the array board 81b in the back surface side are led through first and second connection lines 75 and 77 of the multi-layer wiring region 78b.

Therefore, it is possible to realize an image display apparatus in which the array boards 81a1 and 81a2 in the front surface side and the array board 81b in the back surface side can be driven from end portions by the first connection lines 75 extending in the X-direction on the first insulating layers 74 provided on both surface of the opposite board and the second connection lines 77 extending in the Y-direction on the second insulating layer 76 provided on the opposite board 73.

In addition, since a plurality of projecting electrodes 82 are embedded in frame-like sealing members 83, it is possible to enlarge the area where liquid crystal 85 is enclosed between the opposite board 73 and each of the array boards 81a1, 81a2, and 81b.

FIG. 16 is a view schematically showing layout of twenty five array boards (including thirteen array boards in the front surface side and twelve array boards in the back surface side) and leading of signal lines thereof, constructed in the structure according to the embodiment 11.

In an image display apparatus having a structure as described above, any of a plurality of signal lines extending in the X- and Y-directions in the array boards $81_1$ to $81_{13}$ in the front surface side can be connected with a plurality of connection lines extending in the X-direction, which are indicated by arrows of continuous lines in the figure, on the first insulating layer on an opposite board not shown, and with a plurality of connection lines extending in the Y-direction, which are indicated by arrows of broken lines in the figure, on the second insulating layer on the opposite board. Therefore, even if the array boards $81_1$ to $81_{13}$ are positioned either in the periphery or inside, the array boards can be driven through the connection lines extending in the X- and Y-directions which are be led to end portions.

(Embodiment 12)

Figure 17E:
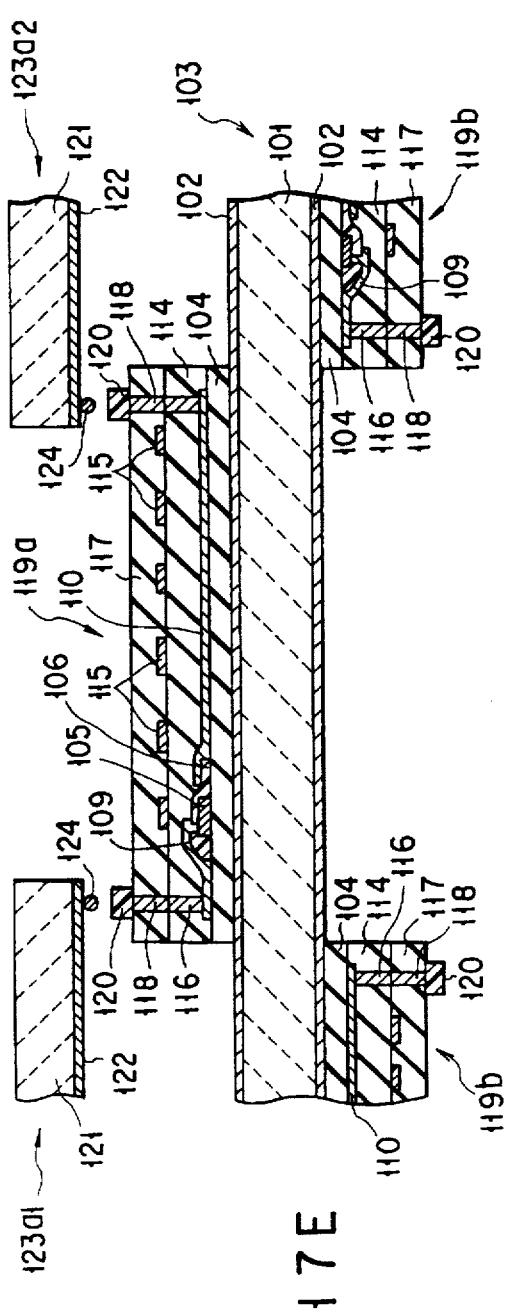
Figure 18:
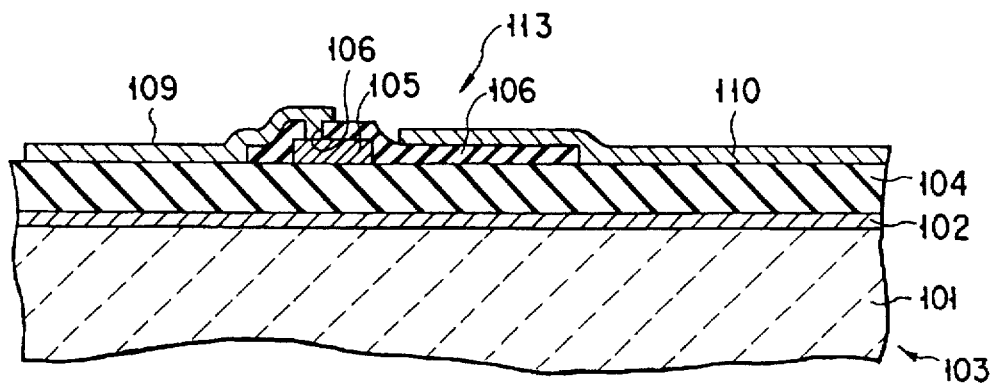
FIG. 18 is a sectional view showing a signal correction circuit formed in a multi-layer wiring region of the embodiment 12.
Figure 19:
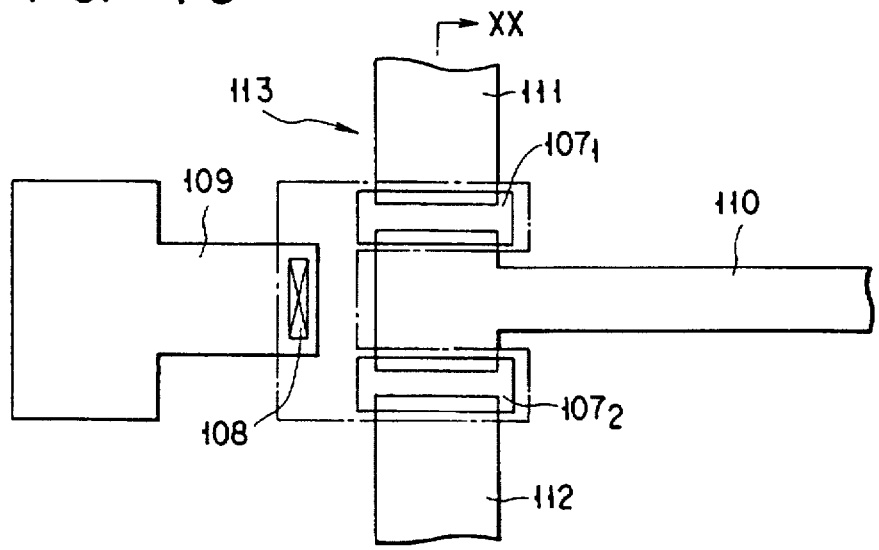
FIG. 19 is a plan view showing the signal correction circuit shown in FIG. 18.
Figure 20:
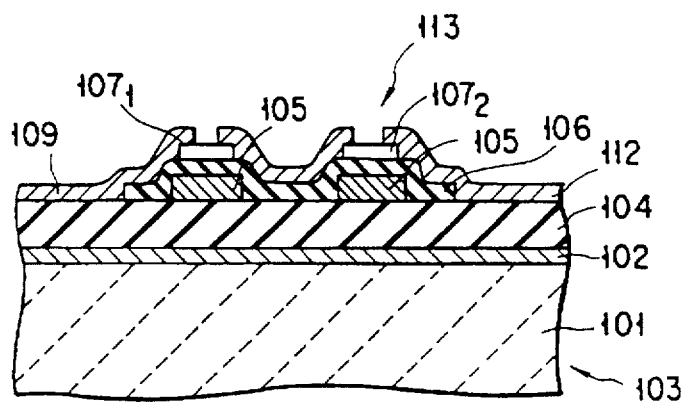
FIG. 20 is a sectional view cut along a line XX—XX of FIG. 19.
Figure 23:
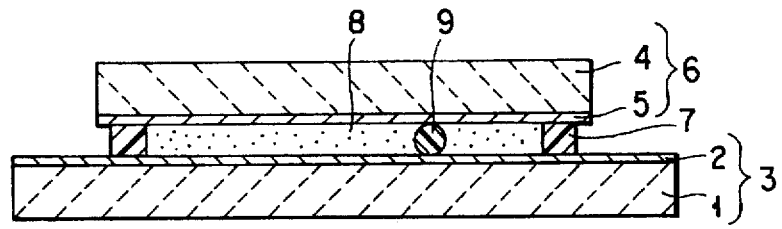
FIG. 23 is a schematic sectional view showing a conventional image display apparatus.
Figure 24:
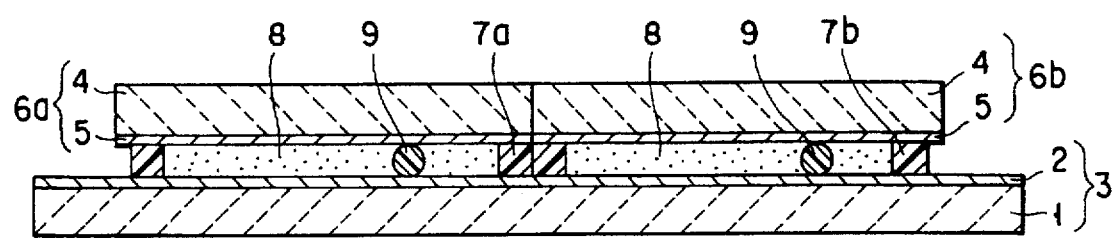
FIG. 24 is a schematic sectional view showing an image display apparatus which attains a large screen with use of two array boards.
Figure 25:
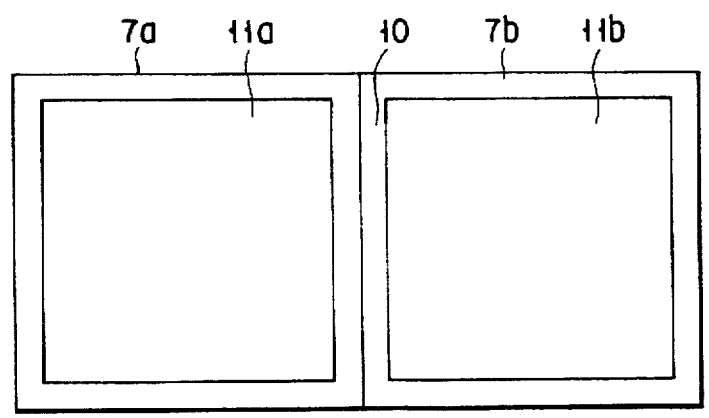
FIG. 25 is a plan view for explaining a problem of a conventional image display apparatus having a large screen.

FIGS. 17A to 17F are schematic sectional views showing steps of manufacturing an image display apparatus according to the embodiment 12 of the present invention. FIG. 18 is a sectional view showing a signal correction circuit incorporated in the image display apparatus. FIG. 19 is a plan view of FIG. 18. FIG. 20 is a sectional view cut along a line XX—XX in FIG. 19.

(i) At first, ITO films each having a thickness of 300 nm were respectively formed on both surface of a transparent substrate 101 having a thickness of 0.7 mm and made of, for example, glass by a sputtering method, to form an opposite board having common electrodes 103. A photosensitive BCB resin precursor solution was coated on the entire surface of one of the common electrodes 103, by a roll coater. The coating was subjected to temporary curing at 80° C. for 20 minutes. Thereafter, ultraviolet light was irradiated through a mask, and unnecessary portions were removed by an organic-based special developer solution (commercial name DS-2100 available at Dowchemical), to form a desired resin pattern. The resin pattern was subjected to baking at 250° C. for an hour, and further to baking at 350° C. for 30 minutes, thereby to form a first insulating layer 104 having a thickness of 1 μm and a transparency of 98% over a wavelength range of 500 nm to 800 nm. On the first insulating layer 104, an Al film was formed by a sputtering method, and thereafter, the Al film was subjected to patterning, to form a gate electrode 105 whose upper surface is U-shaped. An $SiO_2$ film was formed on the first insulating layer including the gate electrode 105, and was subjected to patterning, to form a gate insulating film 106 on the insulating layer 104 including the gate electrode 105. An amorphous silicon film was formed on the first insulating layer 104 including the gate insulating film 106 by a low-temperature CVD method, and was subjected to patterning and further to ion-implantation for injecting p-type and n-type impurities, to respectively form a p-type active layer $107_1$ and an n-type active layer $107_2$ on portions of the gate insulating film 106 corresponding to branched two parts of the U-shaped gate electrode 105. The gate insulating film 106 on the gate electrode 105 was selectively etched and removed to form a contact hole 108. An Al film was formed on the entire surface by a sputtering method, and the Al film was subjected to patterning, to form a Y-direction input wiring 109 connected to the gate electrode 105 through the contact hole 108, a Y-direction lead wiring 110 arranged so as to be layered on those end portions of the active layers $107_1$ and $107_2$ which face each other, and power source lines 111 and 112 arranged so as to respectively be layered on the other end portions of the active layers $107_1$ and $107_2$ with the lead wiring 110 positioned in the middle, as shown in FIG. 17A and FIGS. 18 to 20. Note that pad portions connected with through-holes described later were respectively formed at the left end of the input wiring 109 and the right end of the lead wiring 110. A signal correction circuit 113 was constructed by the gate electrode 105, the gate insulating film 106, the active layers $107_1$ and $107_2$, and the power source lines 111 and 112. In the step as described above, a plurality of input wirings 109 and a plurality of lead wirings 110 were formed on the first insulating layer, and a plurality of signal correction circuits 113 were formed on the insulating layer 104, so as to correspond to the plurality of input wirings 109 and lead wirings 110.

(ii) Subsequently, as shown in FIG. 17B, a second insulating layer 114 made of BCB resin was formed on the first insulating layer 104 including the signal correction circuit 113, in the same manner as in the above case of forming the first insulating layer 104. Further, an X-direction input wiring (not shown), an X-direction lead wiring 115, and a signal correction circuit (not shown) were formed on the second insulating layer 114, in the same manner as in the case as described above. In addition, first through-holes made of Al and respectively connected to the pads of the Y-direction input wiring 109 and the Y-direction lead wiring 110 were formed in the second insulating layer 114.

In the next, a third insulating layer 117 made of BCB resin was formed on the second insulating layer 114 including the signal correction circuit 113, in the same manner as in the above case of forming the first insulating layer 104. Further, second through-holes 118 were formed which were respectively connected with the through-holes 116. Thus, a multi-layer wiring region 119a was prepared which includes first to third insulating layers 104, 114, and 117 as described above, a Y-direction input wiring 109, a Y-direction lead wiring 110, a signal correction circuit 113, an X-direction input wiring (not shown), an X-direction lead wiring 115, and a signal correction circuit (not shown). Subsequently, a BCB resin precursor solution was coated on the third insulating layer 117 including exposed portions of the second through-holes 118 of the multi-layer wiring region 119a, with use of a dispenser, and was subjected to temporary curing at 80° C. for 20 minutes, thereby to form frame-like sealing members 120 not yet hardened, each of which had a width of 50 μm as shown in FIG. 17C. Note that the frame-like sealing members 120 were formed such that edges of the frame-like sealing member 120 were respectively provided on at edges of the multi-layer wiring region 119a. Thus, four frame-like portions were provided on one multi-layer wiring region 119a. In addition, an opening portion (not shown) for injecting liquid crystal described later was formed in the frame-like sealing members 120 not yet hardened.

(iii) In the next, in the back surface side of the opposite board 103, a multi-layer wiring region 119b was prepared as shown in FIG. 17D, in the same manner as those in the above articles (i) and (ii). Thereafter, frame-like sealing members 120 not yet hardened, each of which had a width of 50 μm, were formed.

(iv) In the next, an insulating layer (not shown) made of BCB resin was formed on a surface of a transparent substrate 121 having a thickness of 0.7 mm and made of, for example, glass, in the same manner as in the above case of forming the first insulating layer 104, and thereafter, an ITO film having a thickness of 300 nm was formed by a sputtering method. A resist was coated on the ITO film by a roll coater, and a resist pattern was formed thereon by a photo-etching method. With the resist pattern used as a mask, the ITO film was selectively etched to form a plurality of signal lines 122 extending in the Y-direction and a plurality of signal lines (not shown) extending in the X-direction, on the insulating layer on the surface of the transparent substrate 121, and further, polysilicon gate type TFTs (not shown) were formed as semiconductor elements. In this manner, a plurality of array boards 123a1, 123a2, and 123b were respectively prepared previously. Subsequently, on each of the array boards 123a1, 123a2, and 123b, a plurality of projecting electrodes 124 each consisting of a Au ball having a diameter of about 40 μm were respectively formed on end portions of the signal lines extending in the X- and Y-directions, as shown in FIG. 17E.

(v) In the next, a plurality of spacers 125 made of styrene resin having an average grain diameter of 5 μm were splayed on the opposite board 103, respectively. The array boards 123a1 and 123a2 were positioned in the front surface side of the opposite board 103, such that the projecting electrodes 124 face the sealing members 120 not yet hardened, and thereafter, the array boards 123a1 and 123a2 were pressed to the opposite board 103, respectively. In this state, the projecting electrodes 124 of the array boards 123a1 and 123a2 bit into the frame-like sealing members 120 made of BCB resin not yet hardened and having a flexibility, and had contact with the second through-holes 118 of the multi-layer wiring region 119a, respectively, thereby making electric connection. Subsequently, baking was performed at 250° C. for an hour and further at 350° C. for 30 minutes, so that the frame-like sealing members 120 made of BCB resin as described above were hardened to mechanically fix the array boards 123a1 and 123a2 on the multi-layer wiring region 119a on the opposite board 103. Simultaneously, the projecting electrodes 124 each consisting of the Au ball and the second through-holes 118, made of Al, of the multi-layer wiring region 119 made a solid phase diffusion reaction, so that excellent electric connection was ensured with high reliability. After the baking, the frame-like sealing members 120 had a transparency of 95% over a wavelength range of 500 nm to 800 nm. Subsequently, liquid crystal 126 was injected through each of opening portions (not shown) previously provided in the frame-like sealing members 120, and BCB resin precursor was filled in the opening portions, respectively. Thereafter, baking was performed at 250° C. for an hour to harden the precursor. After the baking, the BCB resin filler had a transparency of 95% or more over a wavelength range of 500 nm to 800 nm. On the back surface of the opposite board 103, the array board 81b was fixed in the same manner as described above. Through these steps, an image display apparatus shown in FIG. 17F was manufactured.

Figure 17F:
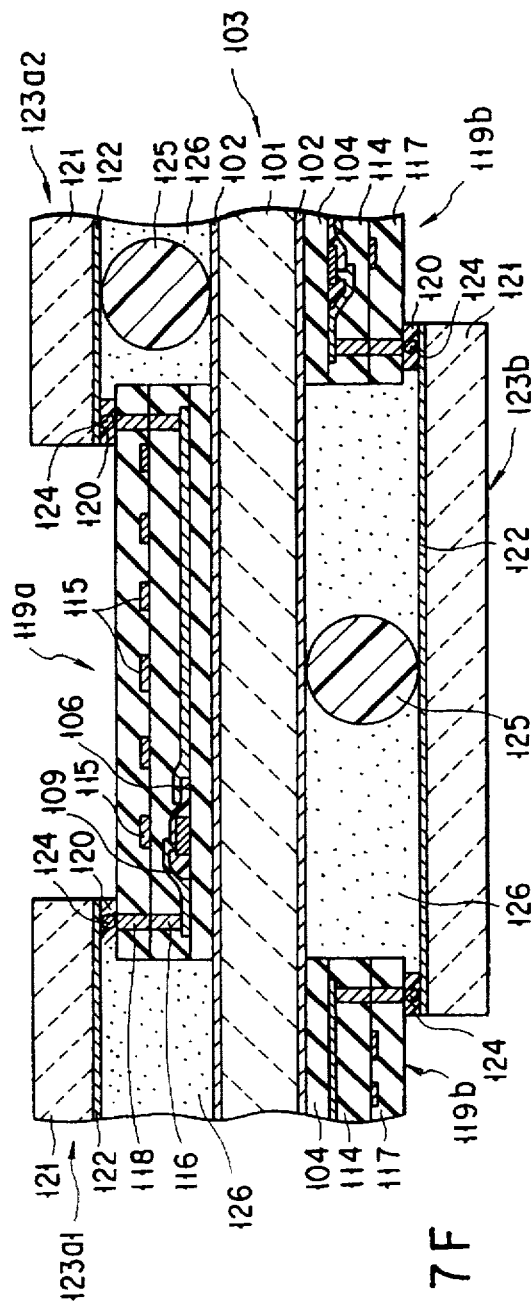

The image display apparatus according to the embodiment 12 comprises an opposite board 103 in which ITO common electrodes 102 each having a thickness of 300 nm are respectively formed on both surfaces of a transparent substrate 101 having a thickness of 0.7 mm, and array boards 123a1, 123a2, and 123b in each of which a polysilicon gate TFT (not shown), signal lines 122 extending in the Y-direction, and signal lines (not shown) extending in the X-direction are formed on an insulating layer (not shown) on one surface of a transparent substrate 121 having a thickness of 0.7 mm, as shown in FIG. 17F. Two array boards 123a1 and 123a2 are arranged on the surface of the opposite board 103 at a predetermined interval, and the array board 123b is arranged on the back surface of the opposite board 103, such that both end portions of the array board 123b respectively face those end portions of the array boards 123a1 and 123a2 that are opposed to each other, with the opposite board 103 arranged therebetween. In other words, viewed from the display surface side, the array boards 123a1 and 123a2 in the front surface side and the array board 123b in the back surface side are arranged to be adjacent to each other, such that those end portions of the array boards 123a1 and 123a2 which face each other respectively overlap both end portions of the array board 123b in the back surface side, with the opposite board 103 inserted between the boards 123a1 and 123a2 and the board 123b.

The multi-layer wiring region 119a is arranged on the surface of the common electrode 102 in the side opposite to the opposite board 103, with the array board 123b arranged. The multi-layer wiring region 119a comprises first to third insulating layers 104, 114, and 117 each made of BCB resin having a transparency of 80% or more over a wavelength range of 500 nm to 800 nm, Y-direction input wirings 109 formed on the first insulating layer 104, Y-direction lead wirings 110, and signal correction circuit 113, X-direction input wirings formed on the second insulating layer 114, X-direction lead wirings 115, and signal correction circuits (not shown).

As shown in FIGS. 18 to 20 as explained above, a signal correction circuit 113 comprises a U-shaped gate electrode 105 formed on the first insulating layer 104 and connected with an input wiring 109 through a contact hole 108, a p-type active layer $107_1$ and an n-type active layer $107_2$ respectively arranged on branched two parts of the U-shaped gate electrode 105 through a gate insulating film 106 and arranged such that a Y-direction lead wiring 110 overlap those end portions of the layers $107_1$ and $107_2$ which face each other, and power source lines 111 and 112 arranged so as to respectively overlap the other end portions of the active layers $107_1$ and $107_2$ with the lead wiring 110 positioned in the center. In the signal correction circuit 113, when a predetermined voltage is applied to the gate electrode 105 through the contact hole 108 with a plus voltage applied to the power source line 111 layered on the p-type active layer $107_1$ and with a minus voltage applied to the power source line 112 layered on the n-type active layer $107_2$, an amplified voltage is outputted from the lead wiring 110 arranged bridging the two active layers $107_1$ and $107_2$. An equivalent circuit of the signal correction circuit 113 is shown in FIG. 21. Note that a signal correction circuit (not shown) formed on the second insulating layer 114 has the same structure as shown in FIGS. 18 to 20.

Frame-like sealing members 120 made of BCB resin having a transparency of 80% or more over a wavelength range of 500 nm to 800 nm are respectively formed in clearances between the multi-layer wiring region 119a and the array boards 123a1 and 123a2. A plurality of projecting electrodes 124 each consisting of Au ball formed on each of the array boards 123a1 and 123a2 are positioned within the sealing members 120 and are connected with the second through-holes 118 of the multi-layer wiring region 119a. Those second through-holes 118, which are close to the array board 123a1 and are disposed in the X-direction, are connected to the Y-direction input wirings 109 on the first insulating layer 104, through the first through holes 116. Those second through-holes 118, which are close to the array boards 123a2 and are disposed in the X-direction, are connected to the Y-direction lead wirings 110 on the first insulating layer 104 through the first through holes 116. Those second through-holes (not shown), which are close to an array board (not shown) to be positioned in foreground in the sheet of the figure and are disposed in the Y-direction, are connected to the X-direction input wirings (not shown) on the second insulating layer 114. Those second through-holes (not shown), which are close to an array board (not shown) to be positioned in background in the sheet of the figure and are disposed in the Y-direction, are connected to the X-direction lead wirings 115 on the second insulating layer 114.

A plurality of spacers 125 are respectively inserted in clearances clearances between the opposite board 103 and the array boards 123a1 and 123a2. Liquid crystal 126 are respectively enclosed in spaces surrounded by the sealing members 120, between the opposite board 103 and the array boards 123a1 and 123a2.

In addition, an array board 123b is fixed by frame-like sealing members 120, in the back surface side of the opposite board 73, like in the front surface side as described above. A plurality of projecting electrodes 124 each consisting of Au ball formed on the array board 123b are positioned within the frame-like sealing members 120, and are respectively connected with the second through-holes 118 of the multi-layer wiring region 119b. A plurality of spacers 125 are inserted in a clearance between the opposite board 103 and the array board 123b, respectively. Liquid crystal 126 is enclosed in a space surrounded by the frame-like sealing members 120 between the opposite board 103 and the array board 123b.

According to the structure as described above, the array boards 123a1 and 123a2 and the array board 123b arranged to be adjacent thereto with the opposite board 103 inserted therebetween are arranged such that end portions of these boards overlap each other, viewed from the display surface side. The frame-like sealing members 120 in the front surface side are compensated for by the display region of the array board 123b in the back surface side. The frame-like sealing members 120 in the back surface side are compensated for by the display regions of the array boards 123a1 and 123a2 in the front surface side. In addition, the first to third insulating layers 104, 114, and 117, the insulating layers (not shown) of the array boards 123a1, 123a2, and 123b, and the frame-like sealing members 120 are all made of BCB resin having a transparency of 95% or more with respect to a wavelength range of 500 nm to 800 nm. As a result of this, no display-impossible region is formed in the display regions, so that it is possible to realize an image display apparatus having a large screen in which the display-possible region corresponds to a region where a plurality of array boards are provided.

A plurality of signal lines 122 extending in the Y-direction on the array boards 123a1 and 123a2 are led through Y-direction input wires 109, signal correction circuits 113, and Y-direction lead wirings 110 connected through the projecting electrodes 124 and the second and first through-holes 118 and 116 of the multi-layer wiring region 119a. Further, a plurality of signal lines (not shown) extending in the X-direction on each of array boards 123a1 and 123a2 are led through X-direction input wirings (not shown), signal correction circuits (not shown) and X-direction lead wirings 115, which are connected through the projecting electrodes 124 and the second through holes 118 of the multi-layer wiring region 119a. Likewise, a plurality of signal lines extending in X- and Y-directions on the array board 123b in the back surface side are led through wirings of the multi-layer wiring region 119b.

FIG. 22 schematically shows leading of signal lines (extending in the Y-direction only) of sixteen array boards (including eight array boards in the front surface side and eight array boards in the back surface side). Specifically, a Y-direction driver circuit 127 and an X-direction driver circuit 128 are provided in the periphery of a plurality of array boards $123_1$, $123_3$, $123_6$, $123_8$, $123_9$, $123_{11}$, $123_{14}$, and $123_{16}$ provided in the front surface side of an opposite board and a plurality of array boards $123_2$, $123_4$, $123_5$, $123_7$, $123_{10}$, $123_{12}$, $123_{13}$, and $123_{15}$. For example, signal lines 122 from the Y-direction driver circuit 127 are connected to an array boards, and signal lines of the array board are connected to another array board through a multi-layer wiring region on the opposite board. In this structure, for example, signal lines 122 of the array board $123_3$ are connected to lead wirings 110 through input wirings 109 and signal correction circuits 113. Therefore, driver signals of the Y-direction driver circuit 127 which enter from the signal lines 122 can be transmitted, amplified by the signal correction circuit 113. As a result of this, it is possible to realize an image display apparatus in which array boards can be driven by signals having initial waveforms even when the lead wirings are elongated by providing a plurality of array boards $123_1$ to $123_9$ on the opposite board.

In addition, since a plurality of projecting electrodes 124 are embedded in frame-like sealing members 120, respectively, it is possible to enlarge the area where liquid crystal 126 is enclosed between the opposite board 103 and each of the array boards 123a1, 123a2, and 123b.

In the embodiments 7 to 12 described above, electric connection between signal lines on an array board and signal lines an opposite board is made by frame-like sealing members and projecting electrodes, which are made of anisotropic conductive resin having a transparency. However, the present invention is not limited thereto. For example, electric connection between signal lines on an array board and signal lines an opposite board may be made by a transparent flexible wiring plate in which strip-like ITO electrodes each having a thickness of, for example, 300 nm are formed on a polyester film.

As has been explained above, according to the present invention, it is possible to provide an image display apparatus having a large screen in which a plurality of array boards are provided on both surfaces of an opposite electrode board and non-display regions are completely eliminated or minimized.

In addition, according to the present invention, it is possible to provide an image display apparatus having a large screen in which a plurality of array boards are provided on both surfaces of an opposite electrode board, non-display regions are completely eliminated or minimized, and signal lines of an array board positioned inside in a plan view can be easily led to the outside.

Further, according to the present invention, it is possible to provide an image display apparatus in which non-display regions in a display surface are completely eliminated or minimized thereby to enlarge the screen size, signal lines of an array board positioned inside in a plan view can be easily led to the outside, and voltages of lead wirings of the signal lines are corrected, for example, by amplification, to obtain excellent image quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An image display apparatus comprising:
    an opposite board in which common electrodes are respectively formed on both surfaces of a transparent substrate;
    array boards in each of which a semiconductor element and a signal line are formed on a transparent substrate, said array boards being arranged on both of the surfaces of said opposite board such that display regions of end portions of said array boards are offset from each other with said opposite board therebetween;
    frame-like sealing members made of transparent resin and inserted respectively in clearances between said opposite board and said array boards; and
    liquid crystal enclosed in each of spaces surrounded by said frame-like sealing members, between said opposite board and said array boards.

2. The apparatus according to claim 1, wherein said frame-like sealing members are made of resin having a transparency of 80% or more with respect to a wavelength of 500 nm to 800 nm.

3. The apparatus according to claim 1, wherein transparent auxiliary boards are further provided on the surface of said opposite board in an opposite side with said array boards arranged, such that said transparent boards have surfaces in a plane equal to surfaces of said array boards, respectively, and a plurality of spacers are inserted between said opposite board and said transparent boards.

4. The apparatus according to claim 3, wherein said spacers are made of low-light absorption material having a coefficient of light absorption of 30% or less.

5. An image display apparatus comprising:
    an opposite board in which common electrodes are respectively formed on both surfaces of a transparent substrate;
    array boards in each of which a semiconductor element and a signal line are formed on a transparent substrate, said array boards being arranged on both of the surfaces of said opposite board such that display regions of end portions of said array boards are offset from each other with said opposite board therebetween;
    a plurality of connection lines for leading the signal lines of said array boards formed on the surface of said opposite board in an opposite side with said array board;
    frame-like sealing members made of transparent resin and inserted respectively in clearances between said opposite board and said array boards; and
    liquid crystal enclosed in each of spaces surrounded by said frame-like sealing members, between said opposite board and said array boards.

6. The apparatus according to claim 5, wherein said connection lines are formed on said transparent substrate of said opposite board.

7. The apparatus according to claim 5, wherein said connection lines are in form of at least one wiring layer provided on said opposite board with an insulating layer inserted therebetween.

8. The apparatus according to claim 7, wherein said insulating layer is made of resin having a transparency of 80% or more with respect to a wavelength of 500 nm to 800 nm.

9. The apparatus according to claim 5, wherein said frame-like sealing members are made of resin having a transparency of 80% or more with respect to a wavelength of 500 nm to 800 nm.

10. The apparatus according to claim 5, wherein said frame-like sealing members are made of anisotropic conductive resin, and said connection lines on said opposite board are electrically connected with said signal lines of said array boards by said frame-like sealing members, respectively.

11. The apparatus according to claim 5, wherein said connection lines on said opposite board are electrically connected with the signal lines of said array boards, by a plurality of conductive grains provided in peripheral portions of the clearances between said opposite board and said array boards, respectively.

12. The apparatus according to claim 11, wherein said conductive grains are provided in said frame-like sealing members, respectively.

13. The apparatus according to claim 5, wherein said connection lines on said opposite board are electrically connected with said signal lines of said array boards, by a plurality of conductive projecting members provided in peripheral portions of the clearances between said opposite board and said array boards, respectively.

14. The apparatus according to claim 13, wherein said conductive projecting members are provided in said frame-like sealing members, respectively.

15. An image display apparatus comprising:
    an opposite board in which common electrodes are respectively formed on both surfaces of a transparent substrate;
    array boards in each of which a semiconductor element and a signal line are formed on a transparent substrate, said array boards being arranged on both of the surfaces of said opposite board such that display regions of end portions of said array boards are offset from each other with said opposite board therebetween;
    at least one layer of connection lines for leading the signal lines of the array boards provided, with an insulating layer inserted, on the surface of said opposite board in an opposite side with said array boards;
    signal correction circuits respectively inserted in portions of said connection lines which are close to said array boards;
    frame-like sealing members made of transparent resin and inserted respectively in clearances between said opposite board and said array boards; and
    liquid crystal enclosed in each of spaces surrounded by said frame-like sealing members, between said opposite board and said array boards.

16. The apparatus according to claim 15, wherein said insulating layer is made of resin having a transparency of 80% or more with respect to a wavelength of 500 nm to 800 nm.

17. The apparatus according to claim 15, wherein said frame-like sealing members are made of resin having a transparency of 80% or more with respect to a wavelength of 500 nm to 800 nm.

18. The apparatus according to claim 15, wherein said frame-like sealing members are made of anisotropic conductive resin, and said connection lines on said opposite board are electrically connected with said signal lines of said array boards by said frame-like sealing members, respectively.

19. The apparatus according to claim 15, wherein said connection lines on said opposite board are electrically connected with said signal lines of said array boards, by a plurality of conductive grains provided in peripheral portions of the clearances between said opposite board and said array boards, respectively.

20. The apparatus according to claim 15, wherein said connection lines on said opposite board are electrically connected with said signal lines of said array boards, by a plurality of conductive projecting members provided in peripheral portions of the clearances between said opposite board and said array boards, respectively.

21. The apparatus according to claim 15, wherein each of the signal correction circuits has an amplification function and includes a pair of transistors each having a gate connected with an input from the signal lines and a source or drain connected with an output end of the signal lines, conductive projecting members are provided in said frame-like sealing members.

* * * * *